(12) United States Patent
Urisaka et al.

(10) Patent No.: US 7,239,312 B2
(45) Date of Patent: Jul. 3, 2007

(54) METHOD, APPARATUS AND PROGRAM FOR PROCESSING A THREE-DIMENSIONAL IMAGE

(75) Inventors: Shinya Urisaka, Kanagawa (JP); Yoshinobu Ochiai, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/260,455

(22) Filed: Oct. 28, 2005

(65) Prior Publication Data

US 2006/0033733 A1 Feb. 16, 2006

Related U.S. Application Data

(63) Continuation of application No. 10/303,791, filed on Nov. 26, 2002, now Pat. No. 7,034,820.

(30) Foreign Application Priority Data

Dec. 3, 2001 (JP) .............................. 2001/368976
Jan. 21, 2002 (JP) .............................. 2002/011636
Jan. 23, 2002 (JP) .............................. 2002/014107

(51) Int. Cl.
*G06T 15/00* (2006.01)
(52) U.S. Cl. ...................... 345/419; 345/420; 345/426; 345/427; 345/629; 345/443
(58) Field of Classification Search ................ 345/419, 345/420, 426, 427, 629, 443
See application file for complete search history.

(56) References Cited

U.S. PATENT DOCUMENTS 5,542,032 A 7/1996 Pritt ............................ 345/421
6,542,249 B1 4/2003 Kofman et al. ............. 356/601
6,858,826 B2 2/2005 Mueller et al. .......... 250/208.1

OTHER PUBLICATIONS

Sato et al. "Object Shape and Reflectance Modeling from Observation", ACM, Aug. 1997, 9 pages.*

* cited by examiner

*Primary Examiner*—Kimbinh T. Nguyen
(74) *Attorney, Agent, or Firm*—Fitzpatrick, Cella, Harper & Scinto

(57) ABSTRACT

An image processing apparatus and an image processing method reconstruct a three-dimensional image of an object which expresses a texture, glossiness, and three-dimensionality with realism. The image processing apparatus produces, from a physical object, data representing a shape and a surface feature of the physical object, holds the data as a three-dimensional model, and presents a three-dimensional image under conditions of an illumination environment and line of sight designated by a user when the three-dimensional image is reconstructed. To present the three-dimensional image at a high speed with realism, the apparatus and method use new and particularly advantageous features in a generation process and in a data format used in the three-dimensional model.

47 Claims, 20 Drawing Sheets

FIG. 3

| HEADER | NO. OF PIECES OF DATA |
| --- | --- |
| | 3-D SHAPE INFORMATION |
| ELEMENT 1 | 3-D POSITION INFORMATION |
| | OBJECT COLOR INFORMATION |
| | REFLECTIVITY INFORMATION |
| ELEMENT 2 | 3-D POSITION INFORMATION |
| | OBJECT COLOR INFORMATION |
| | REFLECTIVITY INFORMATION |
| ⋮ | ⋮ |
| ELEMENT N | 3-D POSITION INFORMATION |
| | OBJECT COLOR INFORMATION |
| | REFLECTIVITY INFORMATION |

METHOD, APPARATUS AND PROGRAM FOR PROCESSING A THREE-DIMENSIONAL IMAGE

This application is a continuation of application Ser. No. 10/303,791, filed on Nov. 26, 2002 now U.S. Pat. No. 7,034,820.

BACKGROUND OF THE INVENTION

1. Field of the Invention

The present invention relates to a method, an apparatus, and a program for processing a three-dimensional image.

2. Description of the Related Art

In a known method, a contact-type position sensor is used as an image processing apparatus for inputting three-dimensional information of an actually present object (such as a shape and a surface attribute). In this method, a probe is put into contact with each point of the object, three-dimensional coordinates of the probe are detected by the position sensor, and the three-dimensional coordinates of each point of the object are input.

Since this method of using the contact-type position sensor requires that the probe be put into contact with the points of the object, there is some limitation. For example, the object to be detected must have a certain degree of solidity and it takes some time to measure the coordinates.

On the other hand, non-contact-type three-dimensional measurement devices are also known. Because of its high-speed measurement capability, the non-contact-type measurement device is used to input data in a CG (Computer Graphics) system or a CAD (Computer-Aided Design) system, to measure the human body, or to recognize objects visually in a robot system.

A slit-ray projection method (or "light chopping" method) or a pattern projection method is known as a non-contact three-dimensional measurement method. These methods are active measurement techniques in which a projector for projecting a particular reference beam to a target object to be measured, and a photosensitive sensor for receiving a beam reflected from the target object are used to obtain three-dimensional data from calculation based on trigonometry.

In the slit-ray projection method, a slit ray is projected and deflected to scan the target object. In the pattern projection method, a plurality of two-dimensional patterns are successively directed to the target object. The resulting three-dimensional data is represented as data points, namely, a set of pixels representing three-dimensional positions of a plurality of regions on the target.

Such a three-dimensional measurement apparatus occasionally has a function of acquiring a surface attribute to obtain texture information of the target object, besides a function of obtaining the three-dimensional data of the target object.

Conventional three-dimensional measurement apparatuses have the function of acquiring texture information of the surface of the object but no function of acquiring data relating to the surface feature or glossiness of the object. When the three-dimensional image is reproduced, the effect of illumination light projected to the object is not accounted for, and an unnatural-looking three-dimensional image results. When the three-dimensional image is reconstructed, the shape, the effect of the position and the color of a light source may need to be changed in a particular image capturing environment. In practice, however, this is not done in any way, and the resulting image becomes much different in appearance from the object. The conventional three-dimensional measurement apparatus is unable to convey glossiness or other surface features of the object.

SUMMARY OF THE INVENTION

It is therefore an object of the present invention to provide a three-dimensional image processing apparatus such as an three-dimensional measurement apparatus, and a three-dimensional image processing method which conveys the surface features, including glossiness, and the three-dimensionality of a target object to a user taking into consideration not only the shape, the texture, and the color of the target object, but also an observation environment during the reconstruction of the image, namely, the shape, the position, and the color of a light source, and the position and the direction of the user with respect to the object.

When the three-dimensional image is constructed, it is necessary to acquire detailed image about the surface of the object. Since it is also necessary to process a vast amount of information, processing delays must also be addressed.

When the three-dimensional of the object is reconstructed based on a variety of information, the information that must be handled becomes complex. It becomes difficult precisely to reconstruct an image if information obtained from a captured image is processed using a designated single algorithm only. A precise reconstruction of the image matching a diversity of changing situations of the target object is not always carried out in a satisfactory manner.

It is therefore another object of the present invention to provide a three-dimensional image processing apparatus and a three-dimensional image processing method, which optimizes the image processing algorithm for fast and precise processing.

It is a further object of the present invention to provide a three-dimensional image processing apparatus and a three-dimensional image processing method, which produces data expressing a high degree of reality by allowing the user to intervene to set a variety of measurement parameters appropriate for the object in the course of producing data required to display a three-dimensional image.

It is yet another object of the present invention to provide a three-dimensional image processing apparatus and a three-dimensional image processing method, which reconstructs a three-dimensional image having a reality with the surface feature, the glossiness, and the three-dimensionality expressed.

To achieve the above objects, the three-dimensional image processing apparatus of one aspect of the present invention captures three-dimensional data representing the shape and the surface feature of the object and image data from the object, estimates surface attribute data from these pieces of data, integrates the estimated surface attribute data with the three-dimensional data to result in a three-dimensional model, and then holds the three-dimensional model. When the three-dimensional image is reconstructed, the three-dimensional image processing apparatus presents a three-dimensional image accounting for an illumination environment designated by the user and the line of sight of the user, besides the three-dimensional model. The three-dimensional image processing apparatus thus allows the user to view the three-dimensional image having reality with the surface feature, the glossiness, and the three-dimensionality of the object reflected.

To present a three-dimensional image having reality at a fast speed, the generation process of this three-dimensional model and the data format thereof have the following features.

When measurement data is obtained from the object to efficiently generate a precise three-dimensional model, units involved in acquiring the measurement data are integrally controlled. As necessary, the user intervenes to set measurement conditions, thereby efficiently and precisely performing shape measurement and surface attribute measurement.

The image data, which is raw data representing the surface of the object, is then subjected to a sorting process carried out subsequent to the acquisition thereof. In this way, the surface attribute estimation process, which is performed in the course of generating the three-dimensional model from the measurement data, is heightened in accuracy.

To increase the efficiency and speed of the estimation process of the surface attribute, three-dimensional data is referenced beforehand, and a determination is made of whether to perform the estimation process of the surface attribute data for each apex forming the three-dimensional data. The estimation process is not carried out for an apex having a low reliability and instead, an interpolation process is performed from the estimated data of another apex in order to assure an estimation accuracy in the surface attribute data.

When a segment where a similarity of surface attribute is predicted from the image data in the estimation process of the surface attribute, a simplified estimation process is carried out for the surface attribute data.

The user is allowed to intervene in the estimation process of the surface attribute to repeat the estimation process, thereby heightening the process accuracy.

In response to a request from the user, measurement accuracy and measurement conditions are modified every segment of the object. A segment having data with a low reliability is selected for measurement or correction in the data thereof. To correct a portion of the three-dimensional model, that portion only is re-measured and the data thereof is updated. A three-dimensional model with high quality thus results.

To allow the user efficiently to perform a complex operation such as those described above, a variety of data including the three-dimensional data reflecting a change in input data when the input data is changed is presented to the user. When the input data is repeatedly changed, the history of data change and the history of three-dimensional data are stored, and then retrieved.

The data format of the three-dimensional model allows similar and duplicated data to be commonly shared, reducing the amount of data. The data is thus easily stored in a storage medium, and is transferred through a network to a remote place where a three-dimensional image may be reconstructed at a high speed.

A three-dimensional image processing apparatus according to another aspect of the present invention for reconstructing a three-dimensional image of an object includes a three-dimensional model generator which generates, from the object, a three-dimensional model which is data for reconstructing the three-dimensional image of the object, and a three-dimensional image synthesizer which synthesizes the three-dimensional image from the generated three-dimensional model, and displays the three-dimensional image, wherein the three-dimensional model generator includes a three-dimensional shape acquisition unit which acquires three-dimensional data relating to a shape of the object, a surface attribute acquisition unit which acquires surface attribute data relating to a surface attribute of the object, and a three-dimensional data integrator which generates the three-dimensional model by integrating the three-dimensional data acquired by the three-dimensional shape acquisition unit and the surface attribute data acquired by the surface attribute acquisition unit.

A three-dimensional image processing method of one aspect of the present invention for reconstructing a three-dimensional image of an object includes generating, from the object, a three-dimensional model which is data for reconstruction the three-dimensional image of the object, and synthesizing the three-dimensional image from the generated three-dimensional model, and displaying the three-dimensional image. The three-dimensional model generating step includes substeps of acquiring three-dimensional data relating to the shape of the object, acquiring surface attribute data relating to a surface attribute of the object, and generating the three-dimensional model by integrating the three-dimensional data acquired in the three-dimensional shape acquisition substep and the surface attribute data acquired in the surface attribute acquisition substep.

Further objects, features, and advantages of the present invention will be apparent from the following description of the preferred embodiments with reference to the attached drawings.

BRIEF DESCRIPTION OF THE DRAWINGS

FIG. 3 is a chart illustrating one example of integrated three-dimensional data generated in the three-dimensional image processing apparatus of the first embodiment of the present invention;

DESCRIPTION OF THE PREFERRED EMBODIMENTS

First Embodiment

Figure 1:
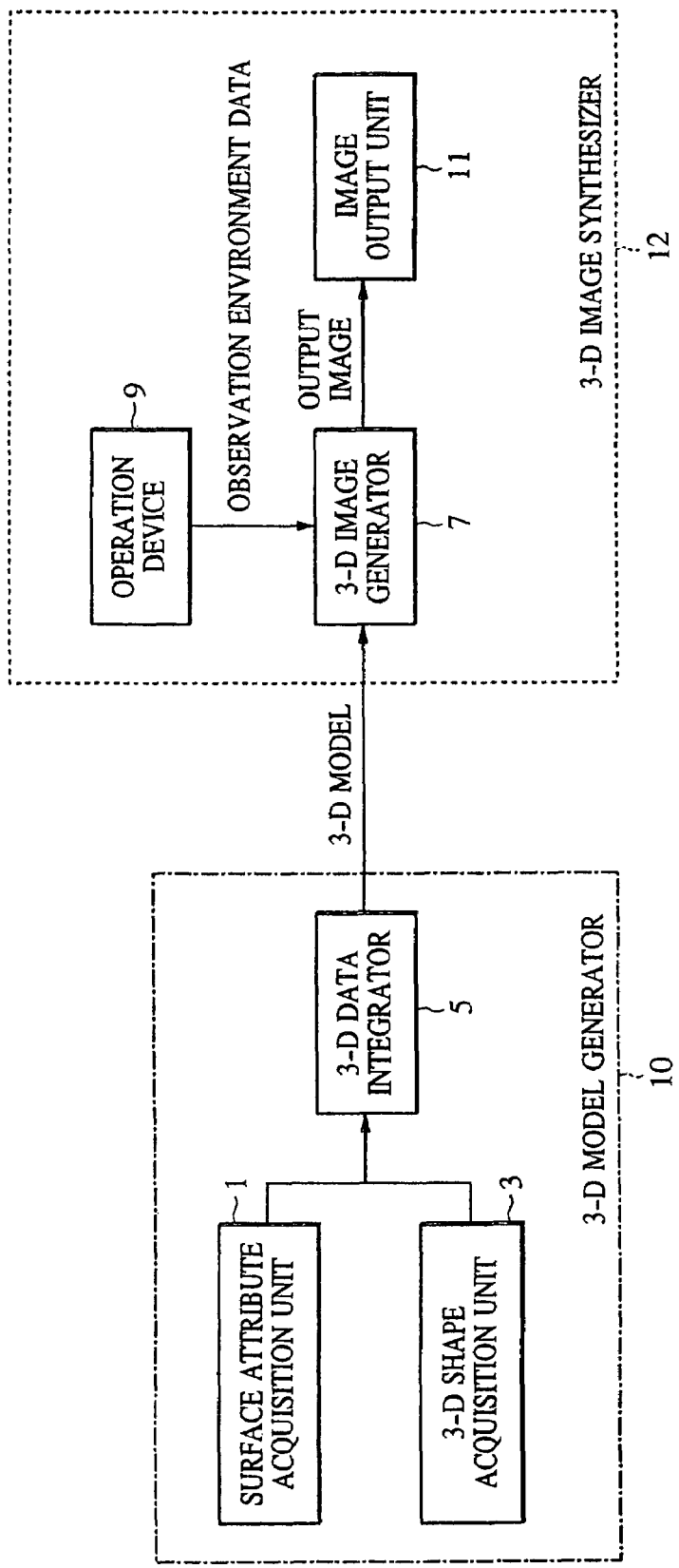
FIG. 1 is a diagrammatic view illustrating the construction of a three-dimensional image processing apparatus in accordance with a first embodiment of the present invention.

FIG. 1 is a diagrammatic view illustrating the construction of a three-dimensional image processing apparatus in accordance with a first embodiment of the present invention. When the three-dimensional image processing apparatus of this embodiment reconstructs a three-dimensional image of a target object captured by a shape measurement device and an image capturing device, the three-dimensional image processing apparatus sets an illumination environment observed to any desired setting, and freely modifies the position and alignment of the target object within an observation space. Under a desired observation environment, the three-dimensional image of the target object is displayed and printed out.

The three-dimensional image processing apparatus includes a three-dimensional shape acquisition unit 3 for acquiring three-dimensional data relating to the shape of the target object, a surface attribute acquisition unit 1 for acquiring surface attribute data relating the surface attribute of the target object, such as the color, the glossiness, and surface features of the target object, a three-dimensional model generator 10 including a three-dimensional data integrator 5 for integrating these pieces of data to obtain a three-dimensional model (as well as elements 1 and 3). An operation device 9 is for setting an observation environment during the reconstruction of a three-dimensional image, a three-dimensional image generator 7 is provided for reconstructing the three-dimensional image of the target object based on the set observation environment for image reconstruction, and an image output device 11 for displaying and printing out the three-dimensional image. These three elements are shown as being portions of a three-dimensional image synthesizer 12.

The three-dimensional shape acquisition unit 3 produces the three-dimensional data from measurement data obtained by the shape measurement device that uses a laser radar method, a slit-ray projection method, or a pattern projection method. The three-dimensional data may be a surface model using a polygon.

The surface attribute acquisition unit 1 acquires image data from the image capturing device, such as a digital still camera, a video camera, or a multi-spectrum camera, which converts an optical image into an electrical signal. In a method to be discussed later, image data is analyzed using the three-dimensional data obtained by the three-dimensional shape acquisition unit 3. The surface attribute acquisition unit 1 estimates surface attribute parameters such as the color, the glossiness, and the surface feature of the target object, and generates the surface attribute data.

The three-dimensional data integrator 5 generates the three-dimensional model by associating the surface attribute data thus obtained with the three-dimensional data. The position, the width, the shape, and the intensity of specular reflection in a reconstructed image are modified using the three-dimensional model depending on the positional relationship of the target object, the illumination light source, and the line of sight of the user and the observation environment such as the color, the luminance, and the shape of the illumination light source during the reconstruction of the image. The surface feature, the glossiness, and the three-dimensionality of the target object are expressed with realism.

The three-dimensional shape acquisition unit 3 and the surface attribute acquisition unit 1 may be separate units or may be a unitary unit into which the two units 1 and 3 are integrated.

The user has an option to set, in the operation device 9, desired illumination conditions and position and alignment of the target object as an observation environment when the three-dimensional image is reconstructed using the three-dimensional data.

The three-dimensional image generator 7 generates a three-dimensional image under the observation environment desired by the user in accordance with the observation environment data set by the operation device 9.

The image output device 11 includes a TV monitor or a printer, and displays or prints out the three-dimensional image generated by the three-dimensional image generator 7.

Figure 2:
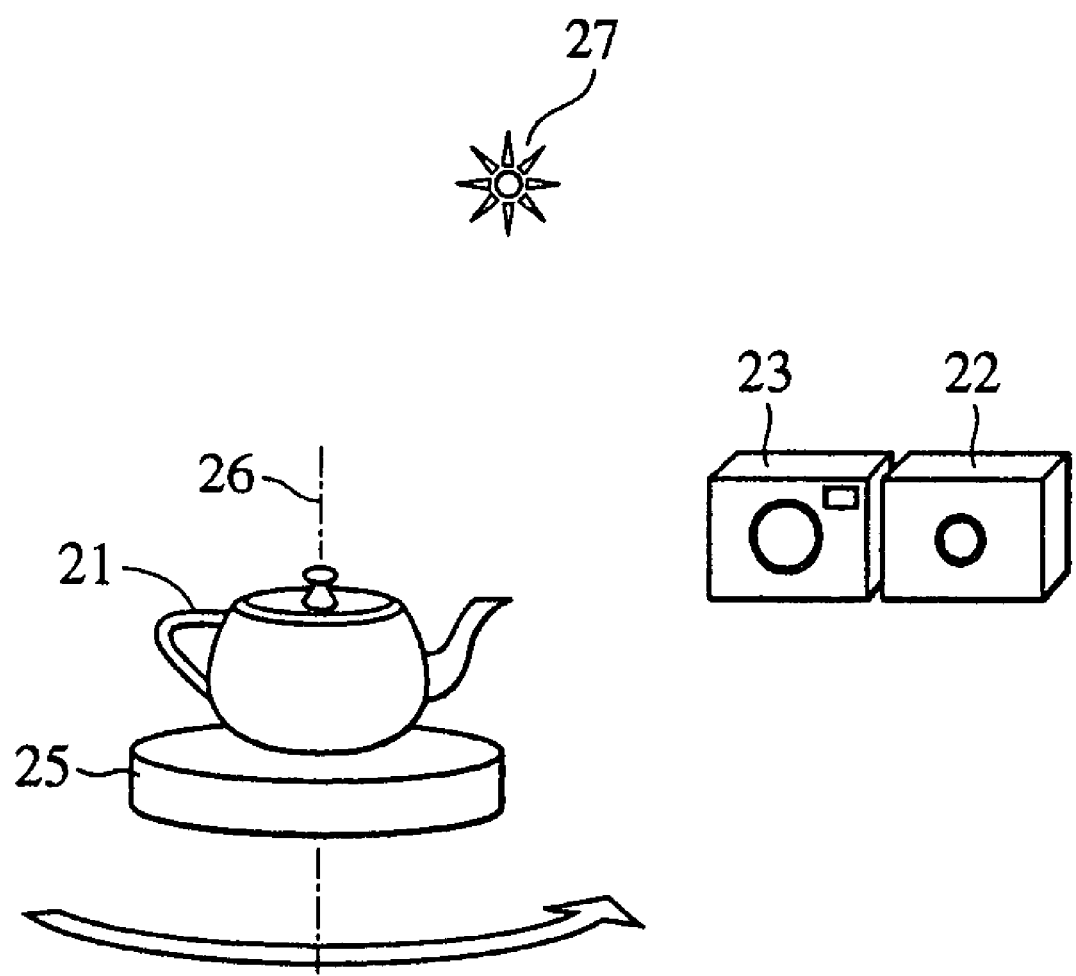
FIG. 2 is a diagrammatic view of a setup of a three-dimensional image processing apparatus of the first embodiment of the present invention for acquiring three-dimensional data and surface attribute data.

FIG. 2 is a diagrammatic view of a setup of a three-dimensional image processing apparatus of the first embodiment of the present invention for acquiring three-dimensional data and surface attribute data. The target object 21 is arranged on a rotation stage 25, which is rotated about an axis of rotation 26. The position of the axis of rotation 26 and an angle of rotation thereof are known in measurement environment.

An illumination light source 27 illuminates the target object when surface attribute capturing is performed. The spectrum of light, the light intensity, the shape of an illumination light beam, the number of light sources, and the position of the light source in the measurement environment are all known.

A shape measurement device 22 and an image capturing device 23 are spaced from the target object 21. The target object 21 is rotated about the axis of rotation 26, and shape measuring and image capturing are performed at regular angle intervals. The shape measurement device 22 and the image capturing device 23 may be integrated into one device. The shape measuring and the image capturing may or may not be performed at a simultaneous timing.

The surface attribute estimation process carried out by the surface attribute acquisition unit 1 in the three-dimensional image processing apparatus of the first embodiment employs a two-reflection-component model in which a light beam reflected from the surface of the target object is divided into two components, namely, a diffuse reflection component and a specular reflection component.

Figure 7:
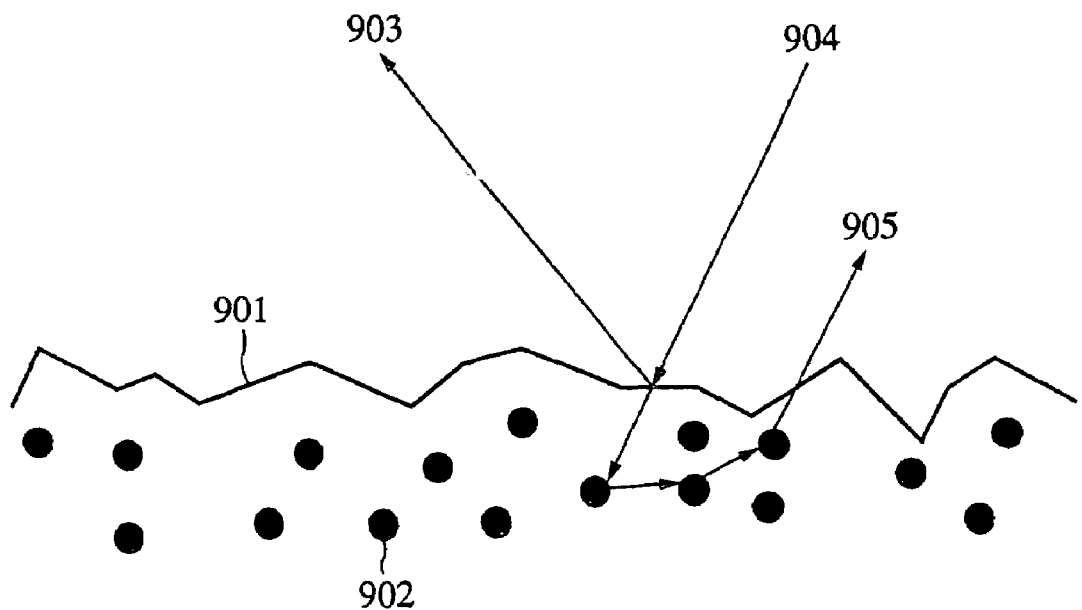
FIG. 7 is a diagram illustrating the concept of a two-reflection-component model representing the feature of light reflected from the surface of an object.
Figure 8:
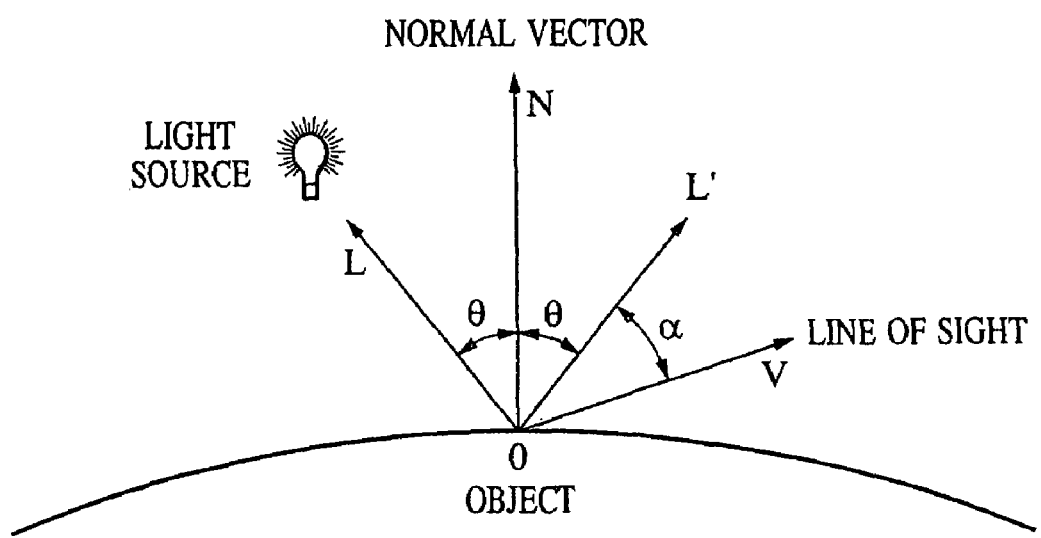
FIG. 8 illustrates a positional relationship of elements of in the two-reflection-component model.

Referring to FIGS. 7 and 8, the way the target object appears in the two-reflection-component model is discussed below. The surface of many of target objects present in the nature or artificial target objects is approximated by the structure of an uneven material.

Light beams incident on the target object is reflected in two physically different paths in the two-reflection component model. A portion 903 of an incident light beam 904 is reflected from a boundary between a target object surface 901 and the air. This phenomenon causing the light beam to be reflected is called specular reflection.

A second path is established when the light beam 904 entering a color layer after passing through the target object surface 901 is scattered by a color particle 902. The reflected light 905 is observed when it returns into the air after being transmitted through the boundary. This reflection is called diffuse reflection. In this way, the light reflected from the target object surface 901 is decomposed into the two components.

Figure 10:
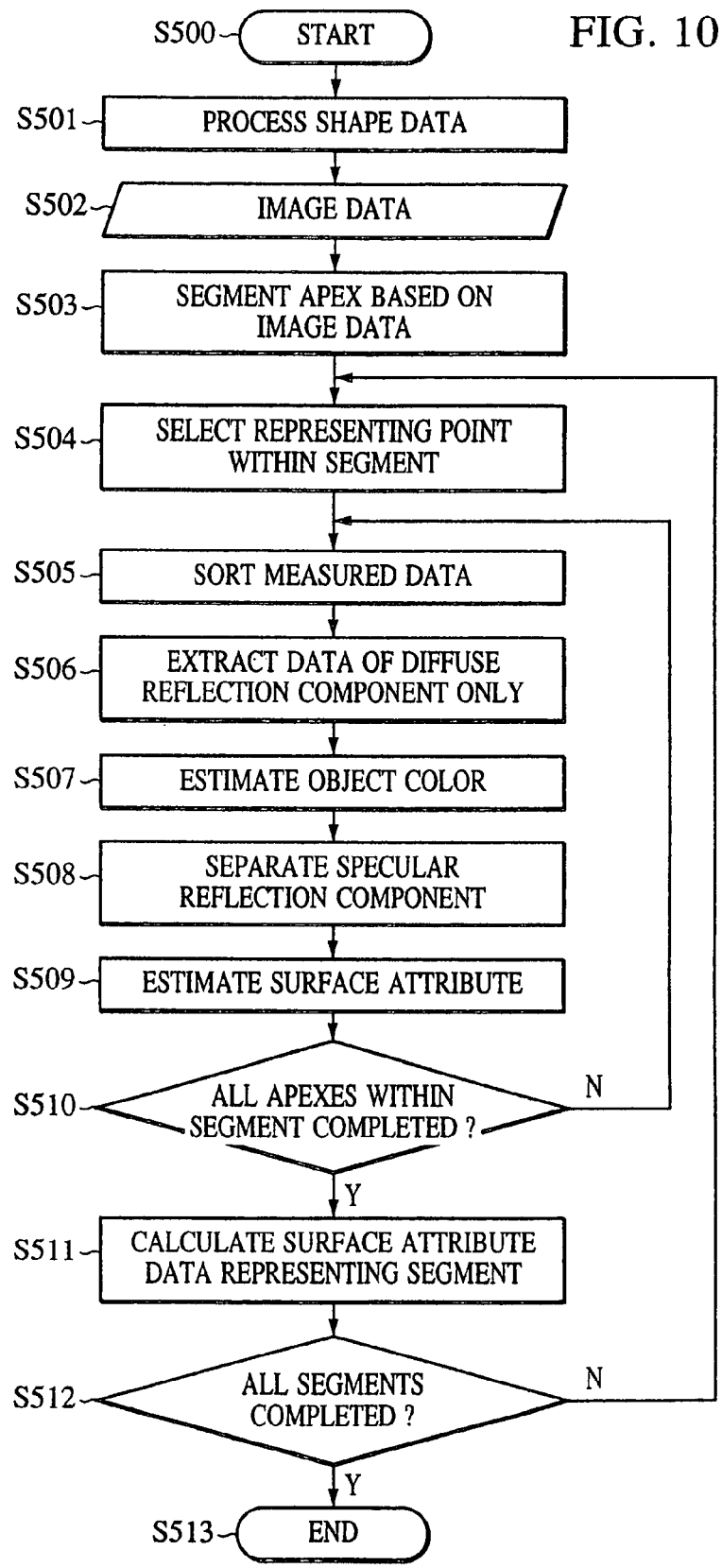
FIG. 10 is a flow diagram illustrating the process of the three-dimensional image processing apparatus in accordance with a fifth embodiment of the present invention.

Referring to FIG. 10, let N represent the normal vector at a given point 0 on the target object, R represent a vector toward a light source, V represent a vector in the line of sight, L' represent a reflected light vector of the light source, and θ represent an angle made between the normal vector N and the vector L to the light source, and an angle made between the reflected light vector L' of the light source and the normal vector N is also θ. A luminance Y of the reflected light beam in the two-reflection-component model is expressed by the following Equation.

$$Y(\theta, \alpha, \lambda) = Y_S(\theta, \alpha, \lambda) + Y_D(\theta, \alpha, \lambda)$$
$$= c_S(\theta, \alpha)L_S(\lambda) + c_D(\theta, \alpha)L_D(\lambda)$$

where, λ is the wavelength of the light, and subscripts S and D respectively refer to a specular reflection component and a diffuse reflection component. $L_S(\lambda)$ and $L_D(\lambda)$ are respectively terms for radiance spectrum distributions of the specular reflection component and the diffuse reflection component.

These terms remain unchanged if the angle is varied. In contrast, terms $c_S(\theta, \alpha)$ and $c_D(\theta, \alpha)$ are determined by geometrical positions.

As described above, the light reflected from the object surface is the sum of the specular reflection component and the diffuse reflection component in the two-reflection-component model as expressed in the above Equation. Each component is considered to contain a term of radiance spectrum depending on the wavelength, and a term of geometrical position depending on the angle.

The image data of each point corresponding to each apex in the three-dimensional data is obtained from the measurement data actually obtained under a plurality of environments. The image data is then analyzed using the shape of a portion read from the three-dimensional data. The surface attribute, composed of the diffuse reflection component, namely, color information of the target object, and the specular reflection component, namely, information of reflection characteristics, is thus estimated at each apex.

FIG. 3 is a chart illustrating an integrated three-dimensional model generated by the three-dimensional data integrator 5. In the three-dimensional model, each apex constitutes the three-dimensional data representing the shape of the target object. The surface attribute parameters, such as three-dimensional coordinates, the object color information, and the reflection characteristic information at each apex, are regarded by one data element, and each data element is held at each apex set up on the target object.

Each time the three-dimensional data integrator 5 generates the data element corresponding to a new apex as an element of the three-dimensional model, the number of elements increases in the three-dimensional model.

During the execution of the three-dimensional shape acquisition and the surface attribute acquisition, the three-dimensional model is placed on a memory (not shown) in the three-dimensional model generator 10. When the three-dimensional shape acquisition and the surface attribute acquisition end, the three-dimensional model is stored in a storage medium such as a hard disk (not shown).

Figure 4:
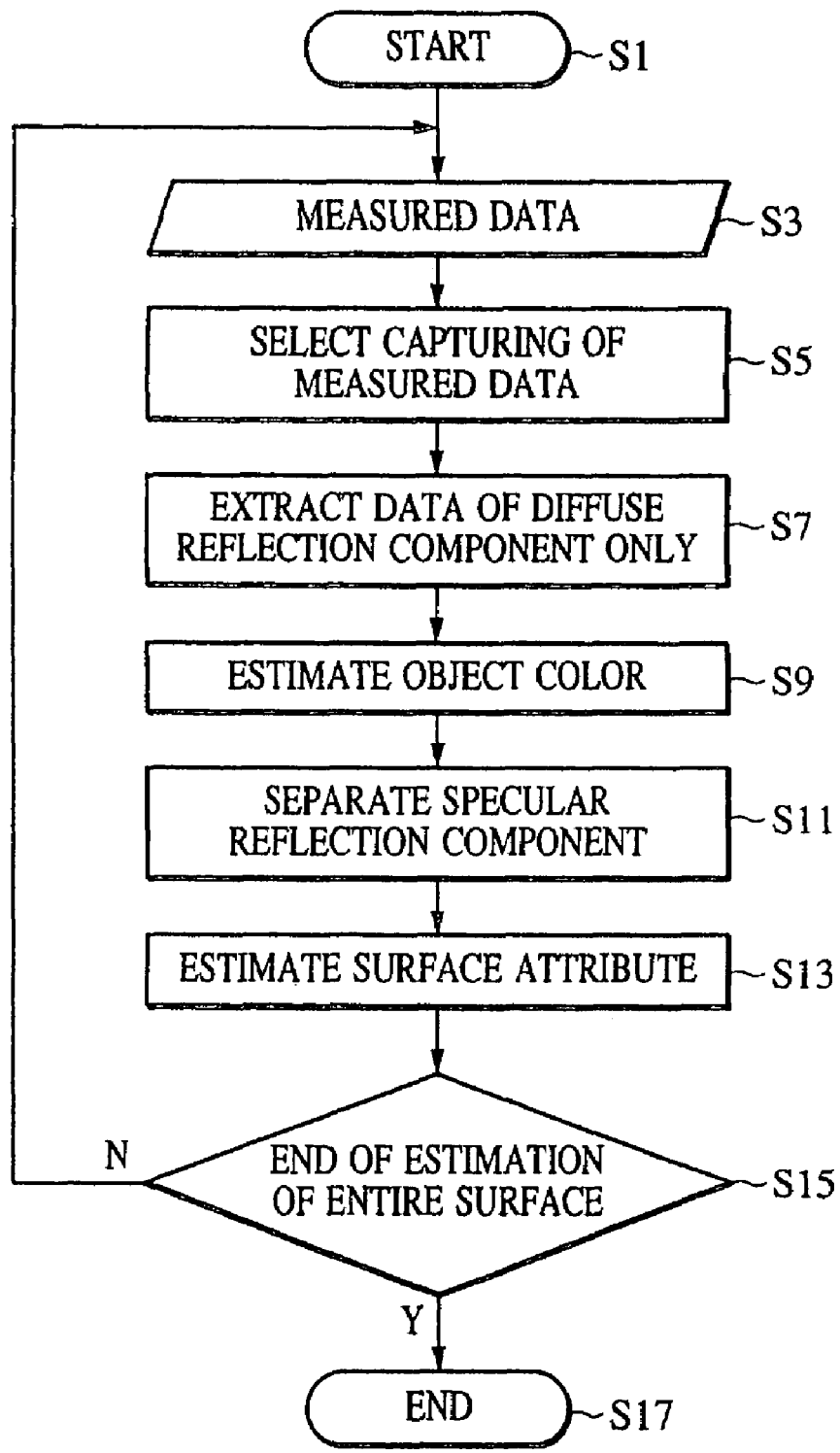
FIG. 4 is a flow diagram illustrating the estimation process of the surface attribute in the three-dimensional image processing apparatus of the first embodiment of the present invention.

The estimation process of the surface attribute performed in the surface attribute acquisition unit 1 of this embodiment is discussed with reference to a flow diagram illustrated in FIG. 4.

When the estimation process of the surface attribute starts (step S1), the surface attribute acquisition unit 1 removes data which lacks information or contains a large error due to the effect of noise, a shadow, an occlusion, or color mixing, out of image data input from the image capturing device 23 (step S3) in connection with each apex of the three-dimensional data representing the surface shape of the target object. The surface attribute acquisition unit 1 sorts the image data for selection and removal in this way (step S5).

Using the selected image data, the surface attribute acquisition unit 1 extracts data of the diffuse reflection component only (step S7). Based on the extracted data, the surface attribute acquisition unit 1 estimates a parameter corresponding to an object color of the surface attribute parameter (step S9).

The surface attribute acquisition unit 1 separates the specular reflection component from the image data (step S11), and estimates a parameter corresponding to reflection characteristics, from among the surface attribute parameters (step S13).

The above process is carried out for all apexes, and the surface attributes parameters are thus estimated for each apex. When the estimation of the entire surface of the target object is completed (step S15), the surface attribute estimation process ends (S17).

Figure 5:
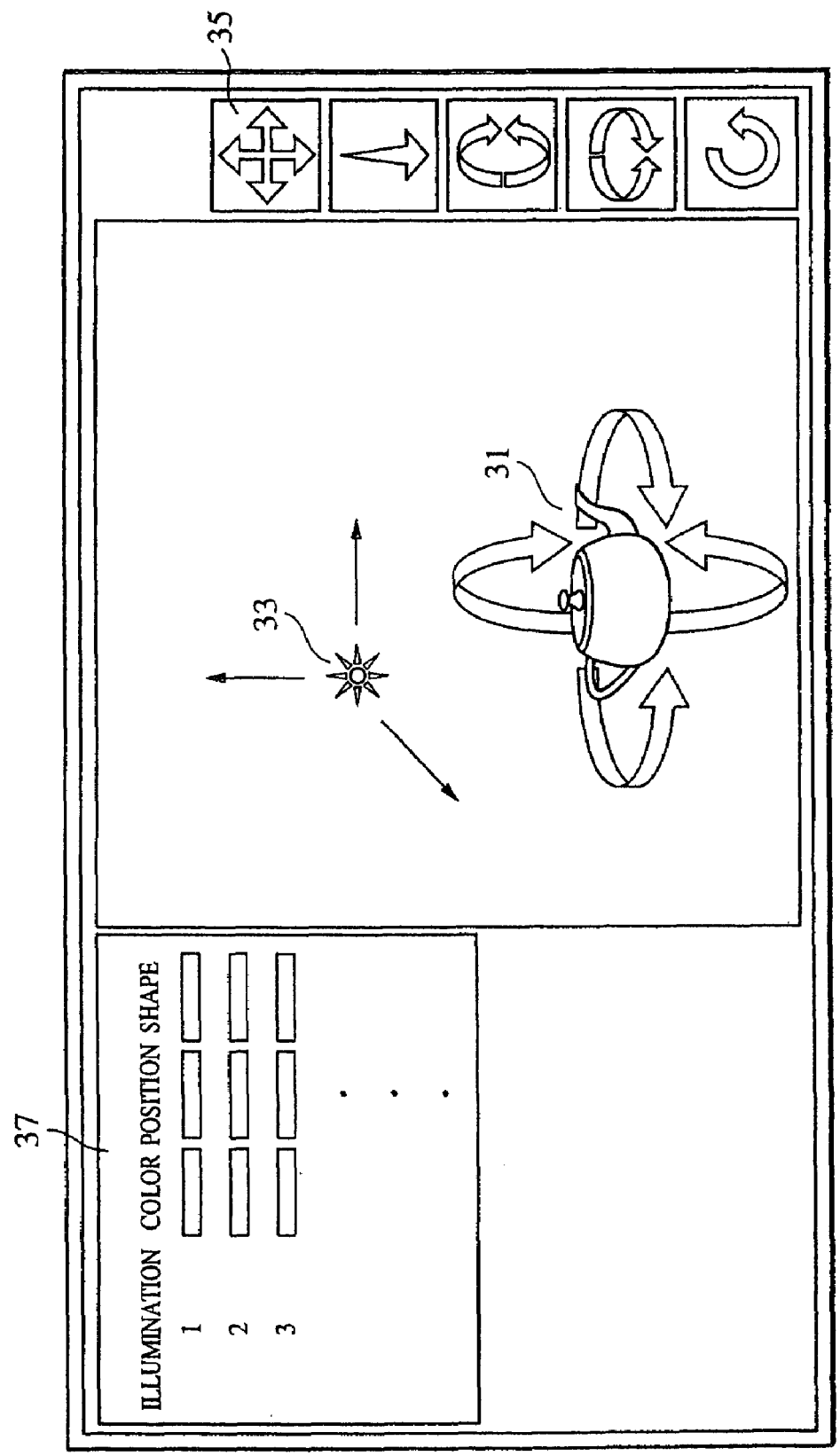
FIG. 5 illustrates an environment image generator and an operation device thereof in the three-dimensional image processing apparatus of the first embodiment of the present invention.

The process of the three-dimensional image generator 7 for reconstructing a three-dimensional image of the target object under the observation environment desired by the user is discussed below with reference to FIG. 5.

Using an illumination light setter 37 in the operation device 9, the user sets the position, the luminance, the shape (a point light source, a line light source, an area light source, or collimated light), and the color of an imaginary light source. This setting may be carried out for a plurality of illumination light sources. At least one illumination light source designated reference numeral 33 and having a desired luminance, shape and color is positioned at a desired location in the observation space.

Using an object location setter 35 in the operation device 9, the user moves the target object in three-dimensional translations up or down, to the right or to the left, and toward or away from the user, and sets an angle of rotation about any axis of rotation. In this observation space, the target object is moved in any direction and rotated as represented by reference numeral 31. The target object is thus viewed in any desired angle.

The three-dimensional image generator 7 reconstructs an image of the target object under an observation environment desired by the user in accordance with the observation environment data set in an illumination light setter 37 and the object location setter 35 in the operation device 9. The three-dimensional image generator 7 then outputs the image of the target object to the image output device 11. Under the observation environment including the target object, the illumination light source, the position of line of sight of the user, and the color, luminance, and shape of the illumination light source set by the user, the position, width, shape, and intensity of the specular reflection are thus varied in the reconstructed image. The three-dimensional image with the texture, the glossiness, and the three-dimensionality of the target object expressed with reality is obtained.

When the place where the three-dimensional image is reconstructed is remote from the three-dimensional model generator in FIG. 1, the three-dimensional model is transferred over a network to reconstruct the three-dimensional image.

In the first embodiment, the three-dimensional data and the surface attribute data are acquired from the measurement data of the target object, and are then integrated into the three-dimensional model. The image of the target object is reconstructed under the observation environment set by the user. The user thus views the three-dimensional image having the texture, the glossiness, and the three dimensionality of the target object expressed with more reality.

The surface attribute acquisition unit 1 sorts the image data input from the image capturing device for selection and disposal. The accuracy level of the surface attribute estimation is raised. A three-dimensional image with much more reality thus results.

Second Embodiment

A second embodiment of the present invention has the following function added to the above-referenced three-dimensional image processing apparatus of the first embodiment to result in a three-dimensional image with more reality with the user's requirements reflected more therein.

Figure 6:
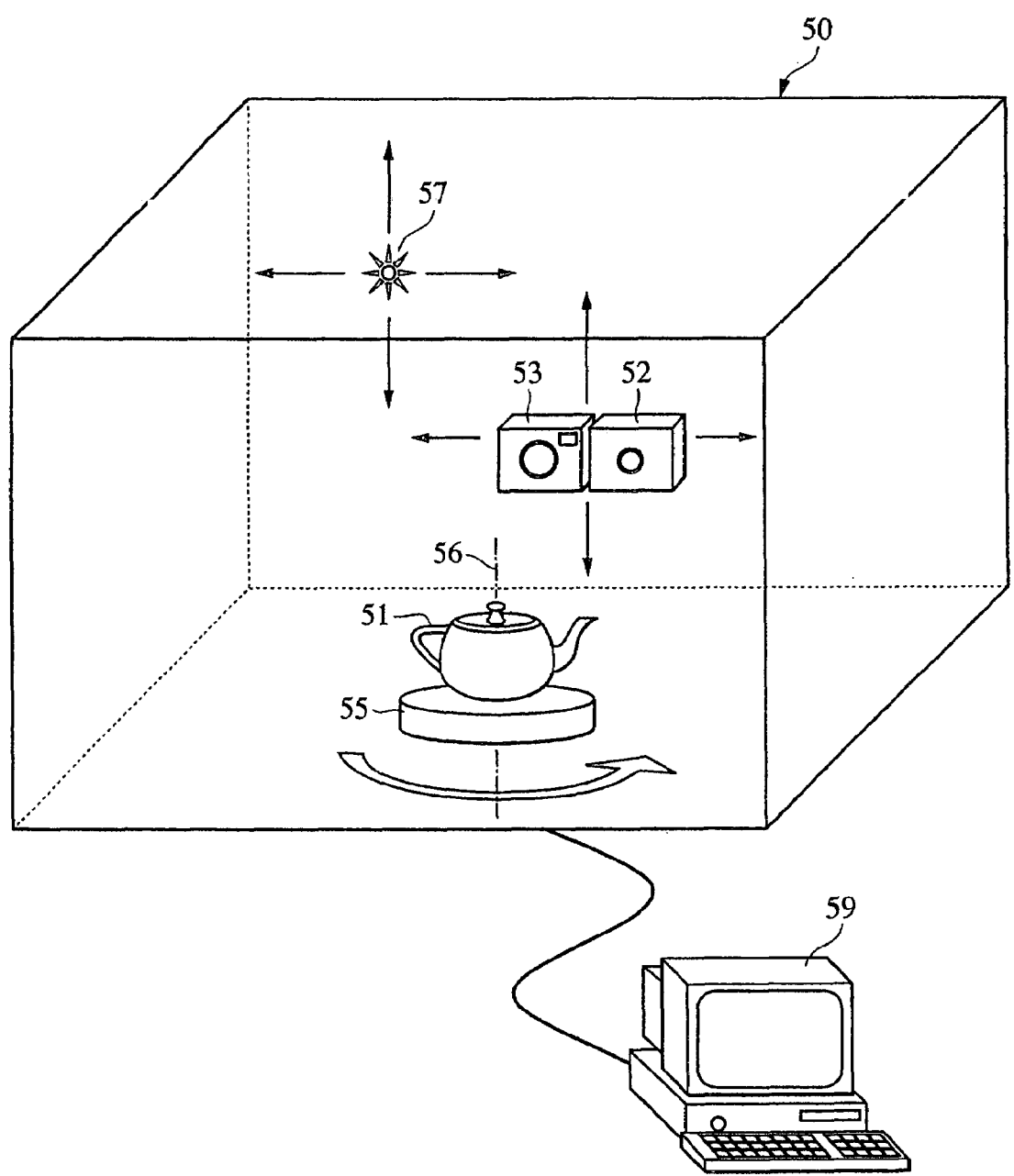
FIG. 6 is a diagrammatic view of a setup of a three-dimensional image processing apparatus of a second embodiment of the present invention for acquiring three-dimensional data and surface attribute data.

FIG. 6 illustrates the general construction of a three-dimensional model generator in the three-dimensional image processing apparatus of the second embodiment. A target object 51 is placed on a computer-controlled rotation stage 55, which is continuously rotated about an axis of rotation 56 by an angle commanded from a computer 59. The position of the axis of rotation 56 is known in the measurement environment.

An illumination light source 57 is used when the surface attribute is acquired from the target object. At least one illumination light source 57 is arranged. The spectrum, the intensity, and the shape of illumination light, the number of light sources 57, and the position of the illumination light source 57 in the measurement environment are controlled in response to a command from the computer 59.

A shape measurement device 52 and an image capturing device 53 are installed at a place spaced from the target object 51, move the target object 51 at any desired position in the measurement space in response to a command from the computer 59, and input measured data.

The computer 59 issues commands to the rotation stage 55, and the illumination light source 57, thereby fixing the measurement environment. The computer 59 then issues commands to the shape measurement device 52 and the image capturing device 53, thereby causing these devices to respectively perform the shape measuring and the image capturing. The shape measurement device 52 and the image capturing device 53 may be integrated into a single unit.

The three-dimensional data and the surface attribute data are acquired from the resulting measurement data, and the three-dimensional model is then produced as in the first embodiment.

In order to heighten the accuracy level of the shape measurement device 52 and the image capturing device 53, the position relationship of the target object with respect to the shape measurement device 52 and the image capturing device 53 and the step angle of rotation of the rotation stage 55 are set to be appropriate depending on the complexity of the shape of the target object and the degree of occlusion. The positional relationship of the target object 51, the image capturing device 53, and the illumination light source 57, and the color, the intensity, and the shape of the illumination light, and the number of the illumination light sources 57 need to be set to optimum values thereof, depending on a similarity between the color of the illumination light source 57 and the color of the target object 51, the ratio of the diffuse reflection component to the specular reflection component in the light reflected from the target object 51, the state of a peak in the specular reflection component, and the uniformity of color distribution of corresponding points.

The computer 59 repeats measurement with control parameters for measurement modified, depending on the result of the three-dimensional image based on the three-dimensional model obtained from the measurement. In this way, a better three-dimensional model results.

In accordance with the second embodiment, the computer control permits the layout of the target object 51, the image capturing device 53, and the illumination light source 57 and sets the characteristics of the illumination light source 57, taking into consideration the shape and the surface attributes of the target object 51. The accuracy level of the shape measurement device 52 and the accuracy level in the surface attribute estimation are raised.

The surface attribute estimation and the process for producing and outputting the desired environment image remain unchanged from those in the first embodiment.

In accordance with the second embodiment, the computer 59 as a controller is provided to change the position, the color, the luminance, the shape, and the number of the illumination light sources 57 to any desired values thereof. As a result, useful measurement data free from the effect of noise, shadow, occlusion, and color mixing is input. The accuracy levels in the three-dimensional shape measurement and the surface attribute estimation are raised. A three-dimensional image with more realism is thus obtained. The computer 59 integrally controls the rotation stage 55, the illumination light source 57, the shape measurement device 52 and the image capturing device 53, thereby measuring the shape of the target object and estimating the surface attribute of the target object, efficiently and precisely.

Third Embodiment

The data format of the three-dimensional model composed of the three-dimensional data and the surface attribute data discussed in connection with the first embodiment is changed in a third embodiment as discussed below.

In the first embodiment, the surface attribute data is held on a per apex basis, each apex constituting the three-dimensional data. In the third embodiment, an infinitesimal unit area having similar surface attribute data from the three-dimensional data is defined. The surface attribute data is held on an infinitesimal unit area basis. In the three-dimensional model in the third embodiment, the surface attribute data is prepared for the number of infinitesimal unit areas defined in the three-dimensional data.

An infinitesimal area serving as a data element is generated by combining each apex constituting the three-dimensional data, and another adjacent to the first apex having similar surface attribute data.

During the three-dimensional shape acquisition and the surface attribute acquisition, the three-dimensional model is stored in a memory (not shown) of the respective devices. When the three-dimensional shape acquisition and the surface attribute acquisition end, the three-dimensional model is stored in a storage medium (not shown) such as a hard disk.

In the third embodiment, in the three-dimensional model, a single piece of surface attribute data is shared by combining a plurality of segments having similar surface attribute data. This arrangement reduces the data size, and is effective when the data is stored in the storage medium such as the hard disk or when the data is transmitted over a network to a remote place where the image is reconstructed as will be discussed later. Particularly when the surface attribute of the target object is monotonic, this arrangement is effective.

Fourth Embodiment

In a fourth embodiment, improvements are introduced in the acquisition method of the surface attribute data in the first embodiment.

Figure 9:
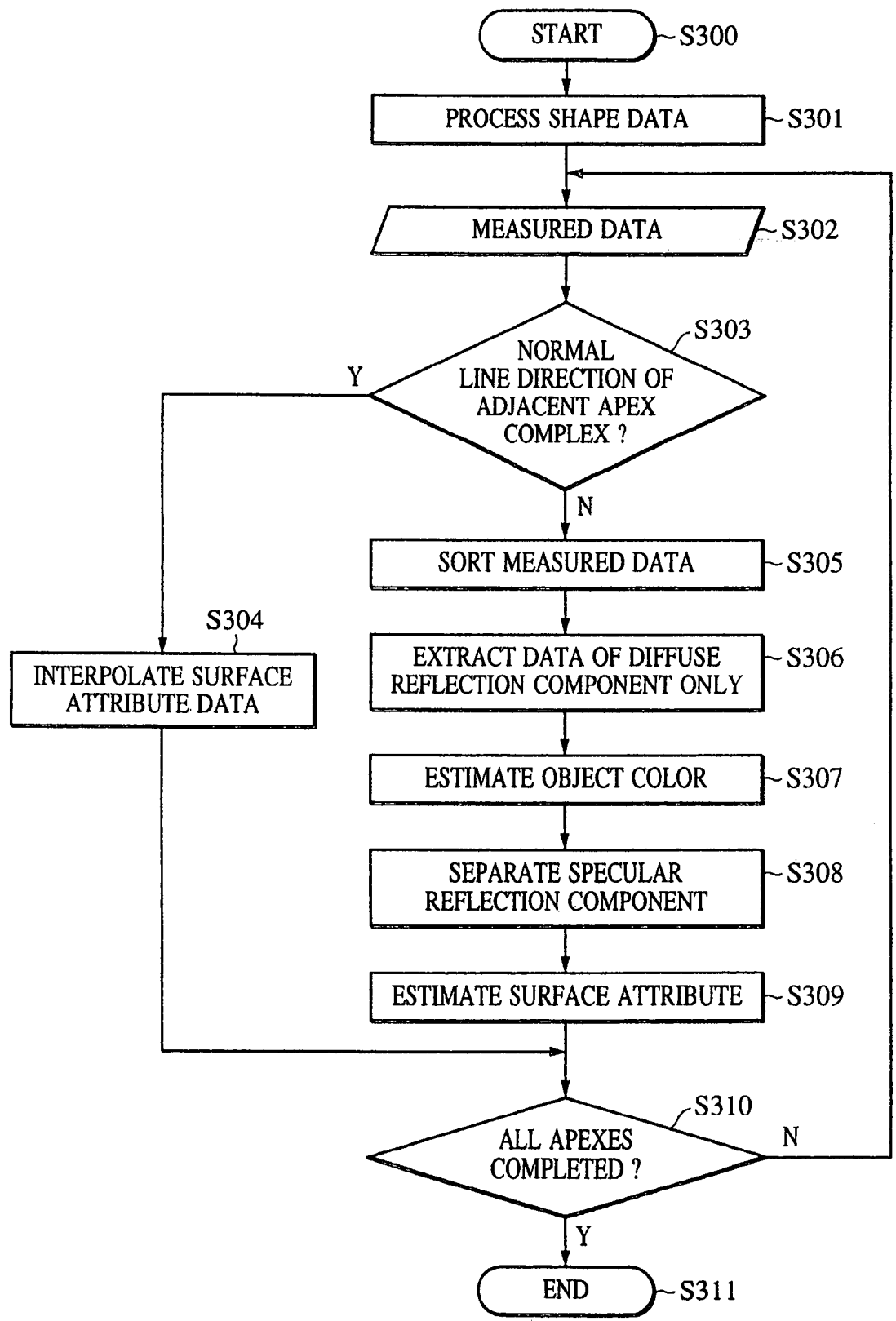
FIG. 9 is a flow diagram illustrating the process of the three-dimensional image processing apparatus in accordance with a fourth embodiment of the present invention.

FIG. 9 is a flow diagram illustrating a surface attribute estimation process carried out by the surface attribute acquisition unit 1 of the fourth embodiment. That flow diagram illustrates the content of a three-dimensional image processing program operating on a personal computer contained in a three-dimensional image display device.

The three-dimensional shape acquisition unit 3 performs a shape data process for each apex on the surface of the target object (step S301). The normal direction of an apex of interest from among apexes constituting the shape data, out of the measurement data (step S302) formed of image data input from the image capturing device 23 is determined. Furthermore, the normal directions of other apexes (for example, surrounding the apex of interest) are determined. The normal directions of these apexes are compared with each other to determine whether the normal directions of the surrounding apexes are significantly different, in other words, to determine whether the geometry surrounding the apex of interest is "complex" (step S303). The criterion of whether or not the geometry is complex is appropriately set depending on factors such as the performance of the apparatus or other conditions. Alternatively, when the difference between the normal directions rises above a predetermined threshold, the geometry may be determined as "complex".

When the geometry surrounding the apex of interest is determined as complex, the estimation of the surface attribute data at that apex possibly suffers from a low reliability. The estimation of the surface attribute data at that apex is not performed, and an interpolation process is performed based on the surface attribute data at another apex, the geometry adjacent to which is not complex (step S304). In this way, an error in the estimation of the surface attribute data applied to the apex having a complex geometry surrounding it is avoided. More natural surface attribute data is thus applied.

In a region where apexes having complex geometries gather, no estimation process is performed on the surface attribute data for that region, and the surface attribute data at an apex having a monotonic geometry surrounding it may be used for interpolation.

When the geometry surrounding the apex of interest is determined as not complex, the surface attribute acquisition unit 1 removes, from the measurement data, data which lacks information or contains a large error due to the effect of noise, a shadow, an occlusion, or color mixing (step S302). The surface attribute acquisition unit 1 sorts the image data for selection and removal in this way (step S305).

Data of the diffuse reflection component only is extracted from the selected measurement data (step S306). Based on the extracted data, the surface attribute acquisition unit 1 estimates a parameter corresponding to an object color out of the surface attribute parameter (step S307).

The surface attribute acquisition unit 1 separates the specular reflection component from the data containing the specular reflection component (step S308), and estimates a parameter corresponding to reflection characteristics, out of the surface attribute parameters (step S309).

The above process is carried out for all apexes, and the surface attributes parameters are thus estimated for each apex. When the estimation of the surface attribute parameter at all apexes of the entire surface of the target object is completed (step S310), the surface attribute estimation process ends (step S311).

The operation device for reconstructing a three-dimensional image of the target object under the observation environment desired by the user and the generation and display of the three-dimensional image in the fourth embodiment remain unchanged from those in the first embodiment.

The three-dimensional data is referenced beforehand in the estimation process of the surface attribute data, and a determination of whether or not the estimation process of the surface attribute data is carried out at each apex constituting the three-dimensional data is performed. The estimation process is not carried out at an apex having a low reliability in connection with the estimation accuracy of the surface attribute data, and the estimated data from another apex is used for interpolation. High accuracy and high speed are thus achieved in the estimation process.

Fifth Embodiment

In a fifth embodiment, improvements are introduced in the generation method of the surface attribute data in the first embodiment.

FIG. 10 is a flow diagram of a surface attribute data process in the three-dimensional image processing apparatus in accordance with the fifth embodiment of the present invention.

In the fifth embodiment, a segmentation is carried out on a target object prior to the estimation of the surface attribute data using a two-reflection-component model. A more accurate estimation is thus performed on the surface attribute data.

The three-dimensional data is generated by processing the shape data input from the three-dimensional shape acquisition unit 3 about the surface of the target object (step S501).

Based on the color and the texture information of the image data input from the image capturing device 23 (step S502), apexes of the three-dimensional data expressing the surface of the target object and belonging to an area having similar image data are grouped into a segment (step S503).

Figure 11:
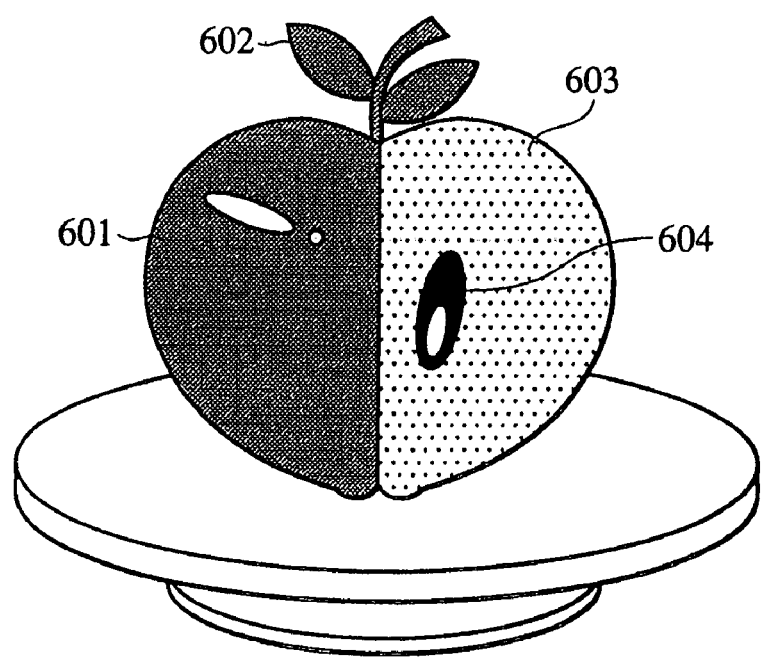
FIG. 11 illustrates the segmentation of the surface of a target object based on the color and texture information of the object.

For example, when the measurement data of the target object shown in FIG. 11 is input, the surface of the target object is partitioned into (particular) segments 601, 602, 603, and 604, based on the color information of each area.

Mere color information of the image data may be used in the segmentation. Alternatively, a variety of image processing operations may be performed on an input image. Specifically, the input image is input to an edge-extraction filter, and resulting edge information may be used. When a feature or regularity is detected in the image data, the feature or the regularity may serve as a criterion in the segmentation. No particular limitation is applied as long as the image data input from the image capturing device 23 is used. A parameter controlling the degree of segmentation may be determined as appropriate depending on the target object.

In this way, apexes on the surface of the target object having similar color or similar texture are grouped into segments.

Figure 12:
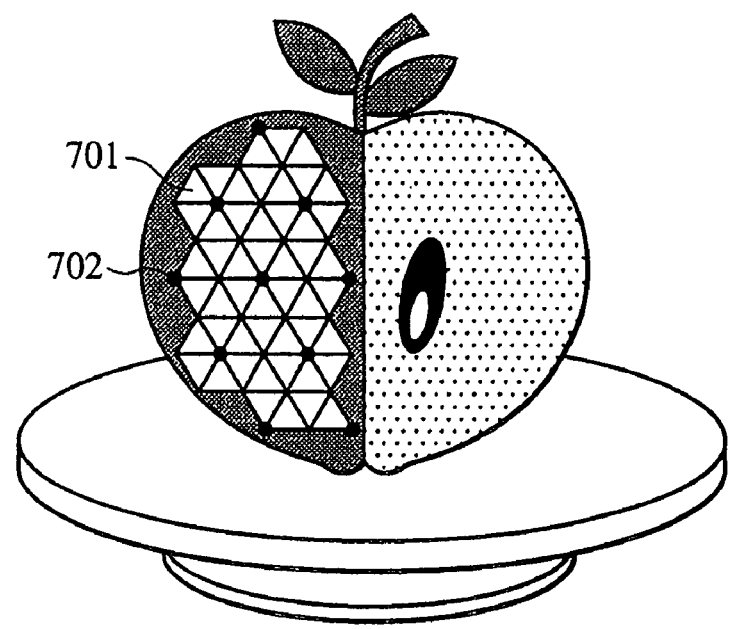
FIG. 12 illustrates a selection method of a representing apex in a segment.
Figure 13:
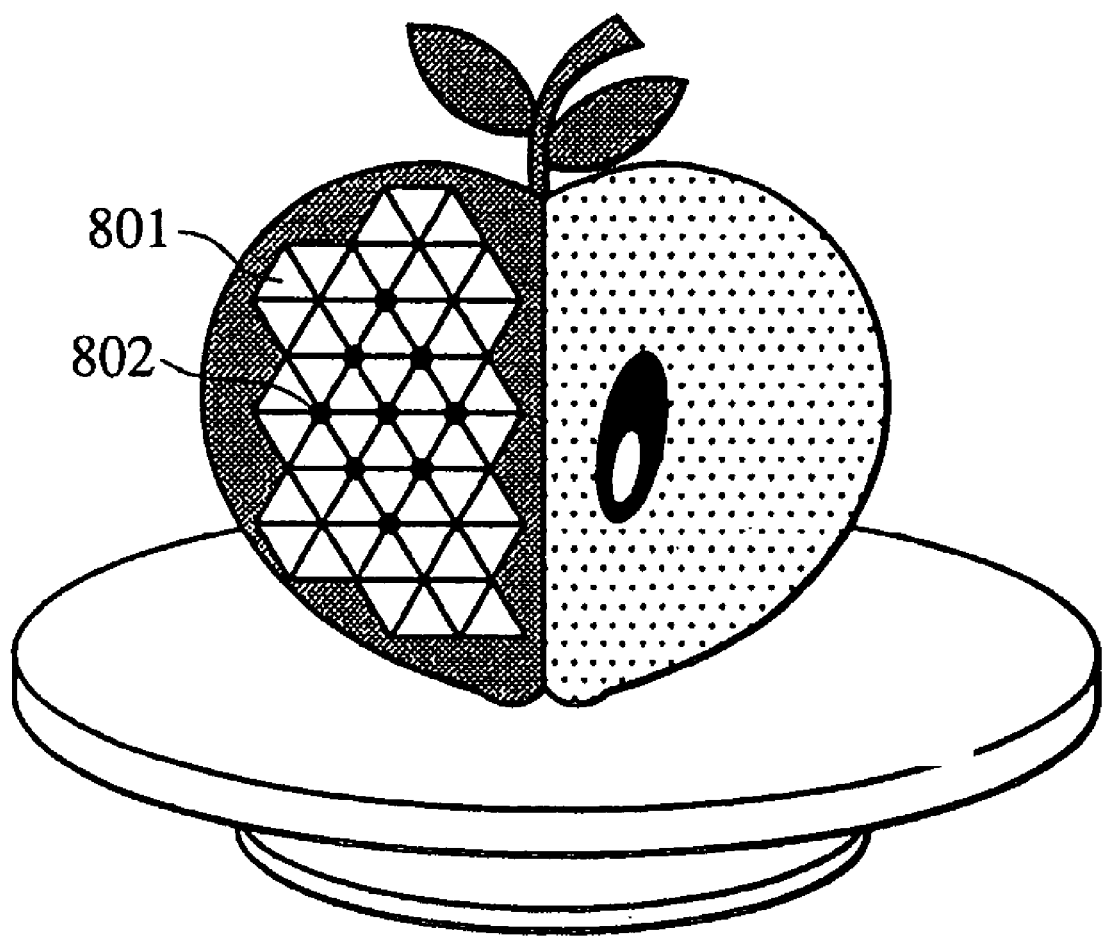
FIG. 13 illustrates a selection method of a representing apex in a segment.

An apex of the three-dimensional data representing each segment is selected in each of a plurality segments (step S504). In a selection method of the representing apex diagrammatically shown in FIG. 12, an apex is evenly selected from a regular number of apexes within the segment 701 at a predetermined ratio. Referring to FIG. 13, an apex 802 is selected in a central portion of each segment not in contact with an adjacent segment. There particular method of selecting the representing apex from within each segment, however, is not necessarily the only one that can be adopted.

An apex in the three-dimensional data representing each segment is selected in this way, and then the surface attribute data estimation process is performed on each apex.

The surface attribute acquisition unit 1 removes, from the measurement data, data which lacks information or contains a large error due to the effect of noise, a shadow, an occlusion, or color mixing. The surface attribute acquisition unit 1 sorts the image data for selection and removal in this way (step S505).

Data of the diffuse reflection component only is extracted using the selected measurement data (step S506). Based on the extracted data, the surface attribute acquisition unit 1 estimates a parameter corresponding to an object color of the surface attribute parameter (step S507).

The surface attribute acquisition unit 1 separates the specular reflection component from the data containing the specular reflection component (step S508), and estimates a parameter corresponding to reflection characteristics, out of the surface attribute parameters (step S509).

The above estimation process of the surface attribute data (steps S505-S509) is successively carried out for all apexes representing respective segments (step S510).

Based on the surface attribute data of the apex representing each segment, the surface attribute data representing each segment (hereinafter referred to as segment representing surface attribute data) is calculated (step S511).

To calculate the segment representing surface attribute data, the surface attribute data of the representing apexes may be averaged, or the surface attribute data of the representing apexes may be weighted averaged based on the correlation between the shape data and the distance to other segment. There is no particular limitation on the use of statistical techniques.

The calculated segment representing surface attribute data is assigned to all apexes within the segment, thereby forming the three-dimensional model. As already discussed in connection with the third embodiment, common surface attribute data may be shared rather than assigning the surface attribute data to individual apexes.

When the segment representing surface attribute data is calculated for all segments, the surface attribute estimation process ends (step S513).

In a segment which is predicted to have a similar surface attribute from the image data, the estimation process is carried out on the representing apexes only appropriately selected from within the segment. Based on the result, the surface attribute data on the entire segment is then estimated. In comparison with the case in which the estimation is performed on all apexes within the segment, the process is performed fast at a high accuracy level.

Apexes which cannot be grouped into a segment as having a similar color and a similar texture, the estimation process of the surface attribute data is performed based on the respective image data of the apexes.

Sixth Embodiment

A sixth embodiment reconstructs a three-dimensional image with reality by allowing the user to intervene in the process of the first embodiment in which the three-dimensional model is generated by acquiring the three-dimensional data and the surface attribute data and then the three-dimensional image is reconstructed.

Figure 14:
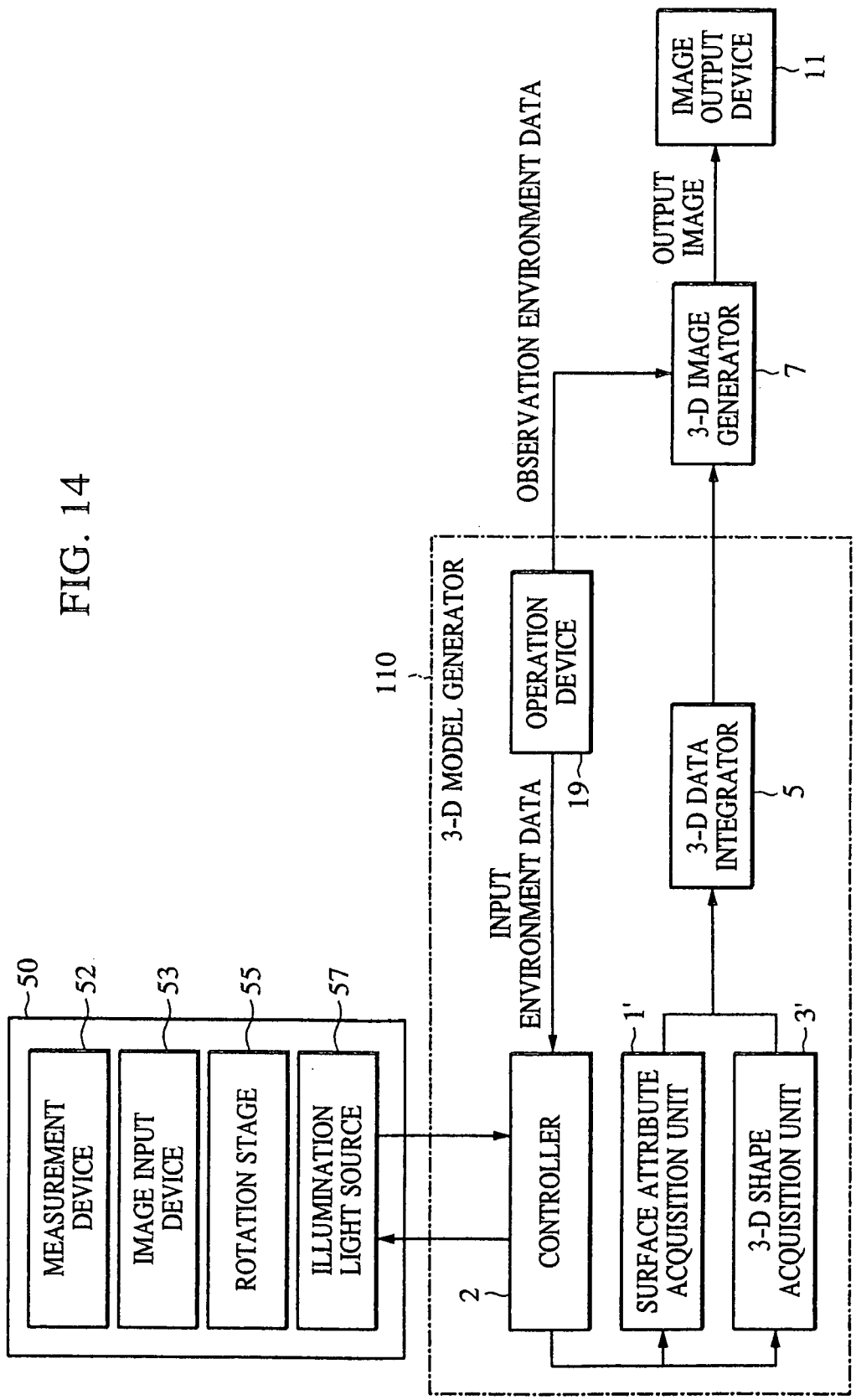
FIG. 14 is a block diagram illustrating the construction of the three-dimensional image processing apparatus in accordance with a sixth embodiment of the present invention.

FIG. 14 illustrates the three-dimensional image processing apparatus in accordance with the sixth embodiment of the present invention. As shown, an operation device 19 inputs an observation environment to the three-dimensional image generator 7. The operation device 19 may also feed input environment data as a variety of parameters for acquiring the three-dimensional data and the surface attribute data. The input environment data input through the operation device 19 is transferred, through a controller 2, to each block in a three-dimensional model generator 110 which acquires the three-dimensional data and the surface attribute data.

The user interacts with a measurement device when the three-dimensional configuration of or the surface attribute of the target object is measured.

The user inputs, to the operation device 19, information concerning the segmentation according to the surface attribute in the three-dimensional shape model, the representing point (in particular segment) the surface attribute of which needs to be estimated, the segmentation according to the complexity of the shape, corresponding points between multi-line-of-sight images, the light source, and a category prepared beforehand into which the surface attribute falls. The operation device 19 generates the input environment data in response to the input information. The input environment data is fed to a three-dimensional measurement device 50 through the controller 2.

In the sixth embodiment, the information required to produce the input environment data and the information required to input the observation environment data are input using the same operation device 19 optionally, separate input devices may be used.

The three-dimensional measurement device 50 has a construction generally identical to that shown in FIG. 6. A target object 51 is placed on a computer-controlled rotation stage 55, which is continuously rotated about an axis of rotation 56 by an angle commanded from a computer 59 connected to the controller 2. The position of the axis of rotation 56 is known in the measurement environment.

An illumination light source 57 is used when the surface attribute is acquired from the target object. At least one illumination light source 57 is arranged. The spectrum, the intensity, and the shape of illumination light, the number of light sources 57, and the position of the illumination light source 57 in the measurement environment are controlled in response to a command from the computer 59 connected to the controller 2.

An optical measurement device 52 and an image input device 53 are installed at a place spaced from the target object 51, and move the target object 51 at any desired position in the measurement space in response to a command from the computer 59, and perform data inputting.

The computer 59 connected to the controller 2 issues commands to the rotation stage 55, and the illumination light source 57, thereby fixing an input environment. The computer 59 also issues command to the optical measurement device 52 and the image input device 53, thereby measuring a three-dimensional shape, and inputting an image. The surface attribute data is generated from the image data and three-dimensional data thus obtained, and a three-dimensional model is produced.

Figure 15:
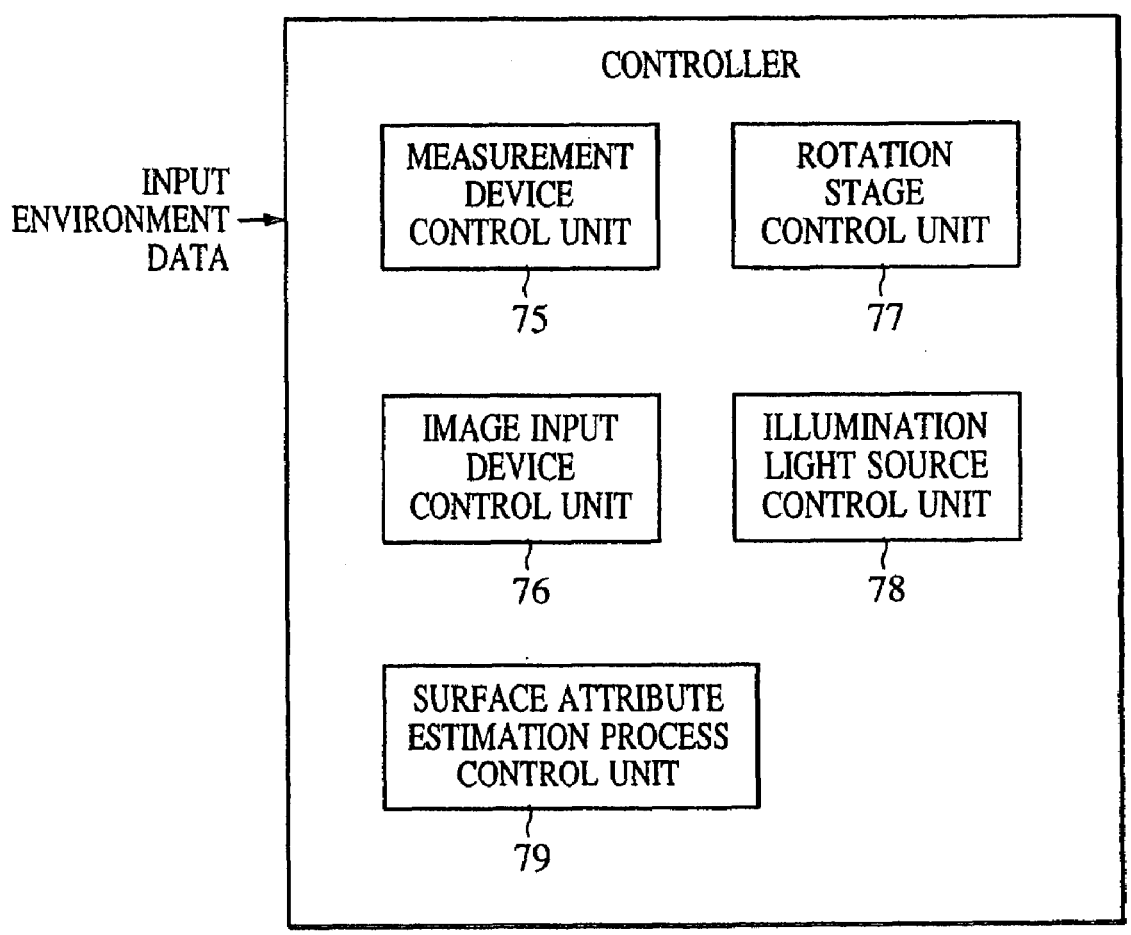
FIG. 15 is a diagrammatic view illustrating a controller in the three-dimensional image processing apparatus in accordance with the sixth embodiment of the present invention.

FIG. 15 diagrammatically illustrates the controller 2. The controller 2 controls the three-dimensional measurement device 50 by way of the computer 59 in response to the input environment data from the operation device 19.

Referring to FIG. 15, a rotation stage control unit 77 continuously controls the angle of rotation of the rotation stage 55 in response to the input environment parameter. An illumination light source control unit 78 controls the illumination light source 57 to adjust the spectrum, the intensity, and the shape of illumination light, the number of light sources 57, and the position of the illumination light source 57 in the measurement environment.

A measurement device control unit 75 moves the optical measurement device 52 to a measurement position determined from the input environment parameter, thereby causing the optical measurement device 52 to continuously input data.

An image input device control unit 76 moves the image input device 53 to a measuring position where the input environment parameter is available, thereby continuously inputting image data.

A surface attribute estimation process control unit 79 controls the surface attribute acquisition unit 1 in the surface attribute estimation process using information concerning the segmentation according to the surface attribute in the input environment parameter, the representing point the surface attribute of which needs to be estimated, corresponding points on multiple images viewed from different lines of sight, the light source, the material category in which the surface attribute to be estimated falls.

Figure 16:
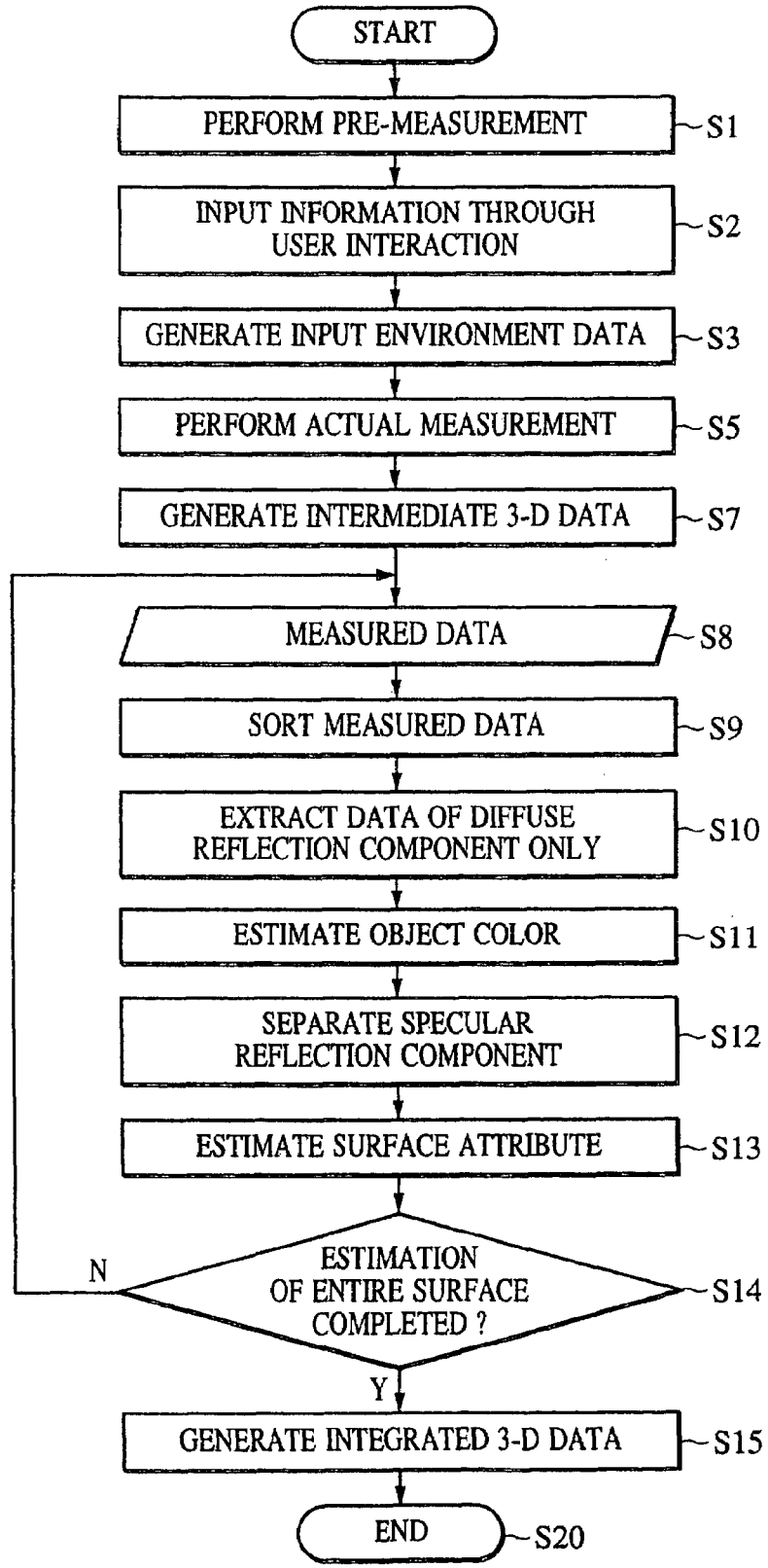
FIG. 16 is a flow diagram illustrating the process of the three-dimensional image processing apparatus of the sixth embodiment from a measurement to the production of a three-dimensional model.

The process from the measurement of the target object to the production of the three-dimensional model in the three-dimensional image processing system of the sixth embodiment is discussed with reference to a flow diagram illustrated in FIG. 16.

Figure 18:
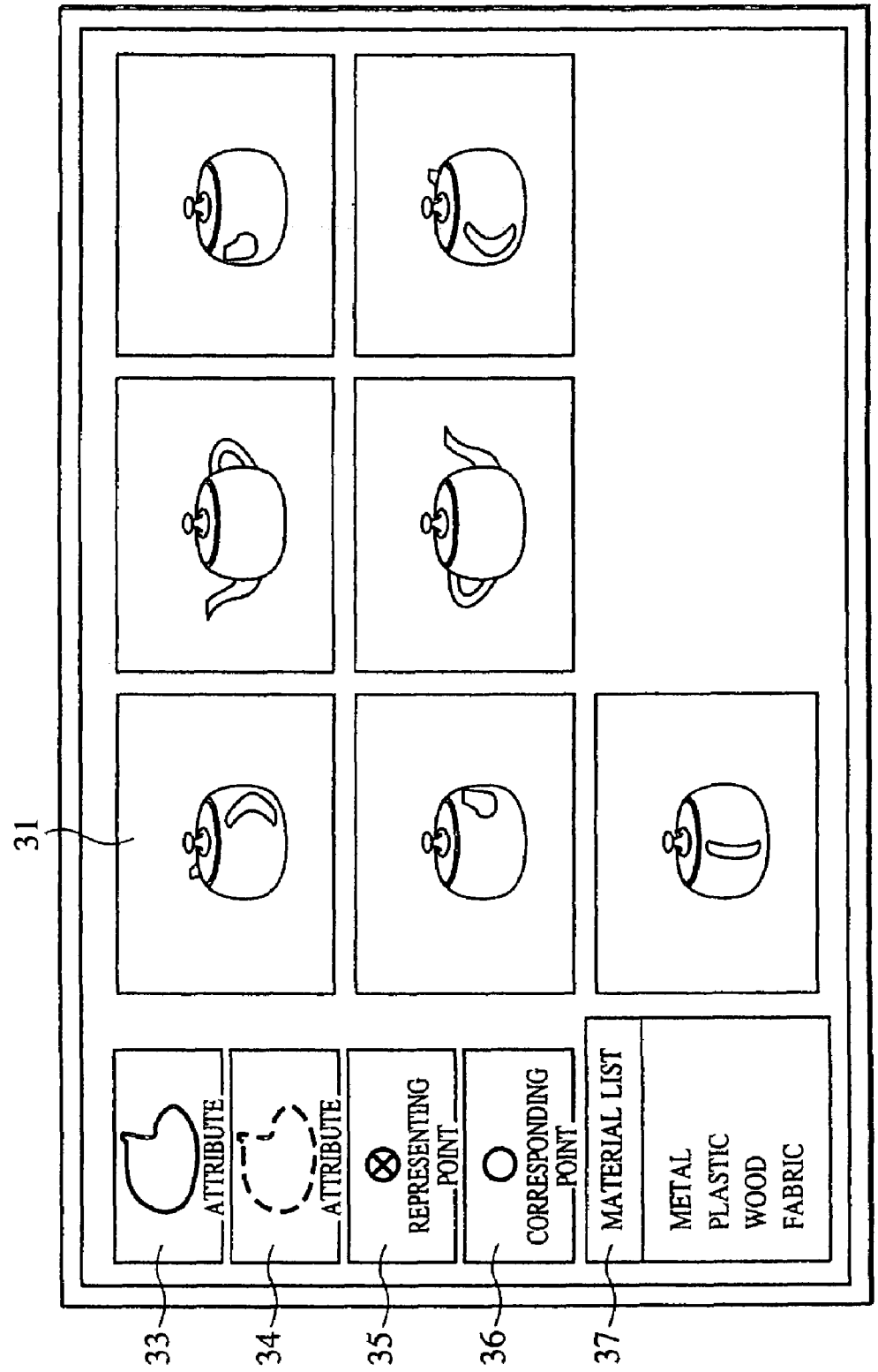
FIG. 18 illustrates a user instruction in an input environment determining unit in the operation device in the three-dimensional image processing apparatus of the sixth embodiment.

A pre-measurement is performed to allow the user to interact with the operation device 19 (step S1). Through the pre-measurement, a series of multi-line-of-sight images as rough three-dimensional images of the target object as shown in FIG. 18 is output to the image output device 11. The images are thus displayed or printed out.

The user, who views the series of multi-line-of-sight images presented on the display monitor or printout subsequent to the pre-measurement, interacts with the operation device 19 and inputs information concerning the segmentation according to the surface attribute, the representing point the surface attribute of which needs to be estimated, the segmentation according to the complexity of the shape, corresponding points between the images from different lines of sight, the light source, and a category prepared beforehand into which the surface attribute falls (step S2). In response to these pieces of information, the input environment data is generated (step S3).

In the segmentation according to the complexity of the shape or the segmentation according to the surface attribute, the step angle of rotation of the rotation stage 55 is made fine or the optical measurement device 52 and the image input device 53 is placed in a position that permits detailed measurement of the target object if a segment has a complex shape or is in the vicinity of a boundary of a uniform surface attribute segment.

Conversely, in a segment having a smooth shape, a segment having a uniform surface attribute, or a segment with a representing point for the surface attribute set up, the step angle of rotation of the rotation stage 55 and the position of the optical measurement device 52 and the image input device 53 are set so that no extra measurement data is obtained.

If the category of a predetermined material list in which the surface attribute to be estimated falls is set, the step angle of the rotation stage 55, the position of the optical measurement device 52 and the image input device 53, the spectrum, the intensity, and the shape of illumination light, the number of light sources 57, and the position of the illumination light source 57 are set so that the image capturing conditions becomes appropriate for each material. For example, the step angle of rotation of the rotation stage 55 is made fine in a metal to obtain an accurate peak in the specular reflection component, while the intensity of the illumination light source 57 is set to a proper value.

Based on the input environment data, the optical measurement device 52 and the image input device 53 perform measurements on each apex on the surface of the target object, acquiring data (step S5), and producing the three-dimensional data (step S7).

Based on the input environment data, the surface attribute acquisition unit 1 removes, from the input image (step 8) data, data which is not necessary for the estimation process, and data which lacks information or contains a large error due to the effect of noise, a shadow, an occlusion, or color mixing. The surface attribute acquisition unit 1 sorts the image data for selection and removal in this way (step S9).

As in the first embodiment, the surface attribute estimation process is performed on each apex of the three-dimensional data using the image data selected according the two-reflection-component model.

If a segment having a uniform surface attribute is set up in the input environment data, the estimation process is carried out under the condition that the surface attribute is uniform in each segment. If a representing point of the surface attribute is set up, the representing point only is estimated. On other points, an interpolation process is performed based on the estimated value at the representing point.

If the category of a predetermined material list in which the surface attribute to be estimated falls is set, an estimation process appropriate for the material is carried out.

If the corresponding points between the multi-line-of-sight images and the light source information are set, an estimation process is carried out using these pieces of information.

When the estimation of the entire surface of the target object ends (step S14), the three-dimensional model results (step S15). The unit of the surface of the target object is the apex here. Instead of the apex, the infinitesimal area may be used.

Figure 17:
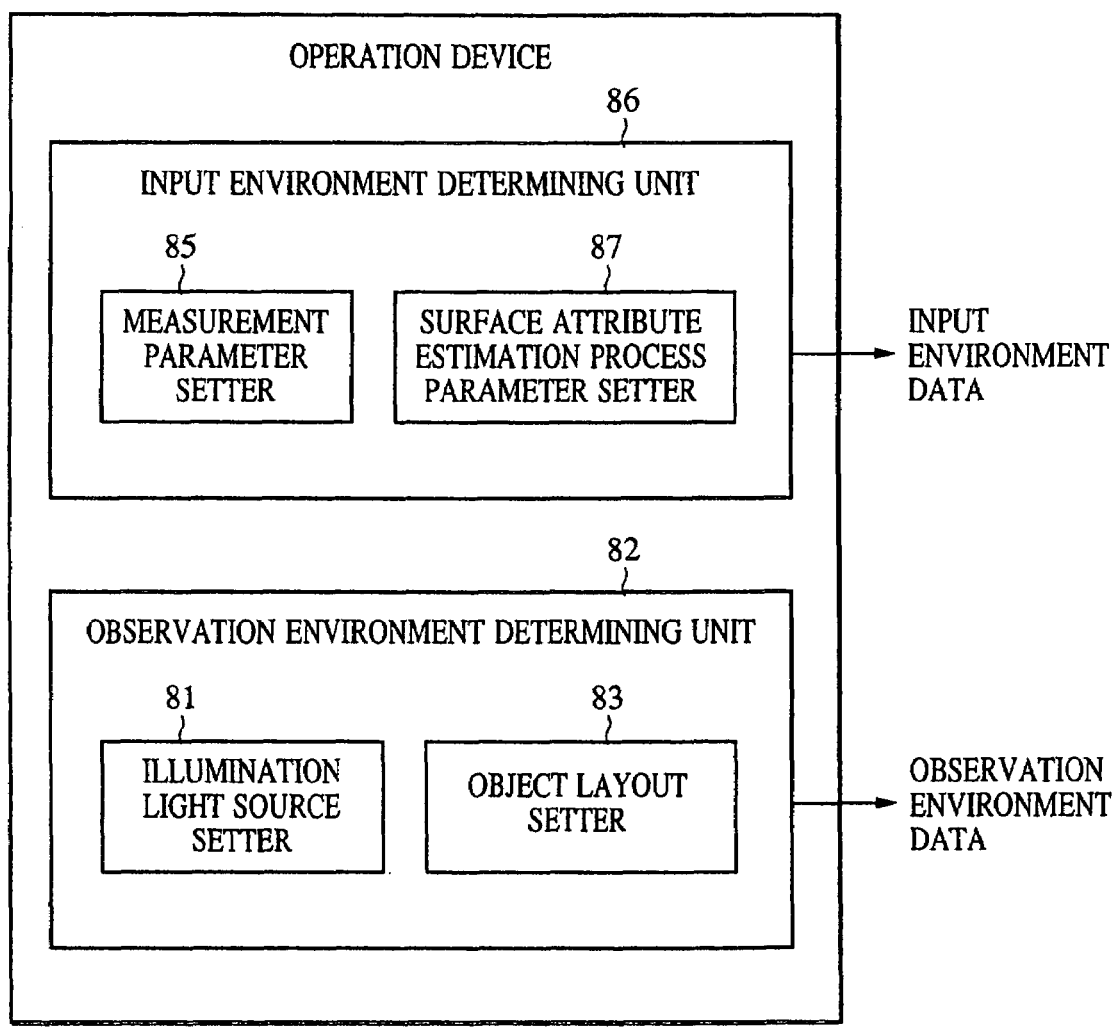
FIG. 17 is a diagrammatic view illustrating an operation device in the three-dimensional image processing apparatus of the sixth embodiment.

FIG. 17 illustrates the construction of the operation device 19. The operation device 19 includes an input environment determining unit 86 for generating the input environment data, and an observation environment determining unit 82 for generating the observation environment data. The input environment determining unit 86 generates the input environment data such as a parameter in the measurement of the target object and a parameter in the surface attribute estimation process.

Referring to FIG. 17, the measurement parameter setter 85 controls the angle step of rotation of the rotation stage 55 for performing the measurement, the position of the optical measurement device 52 and the image input device 53, the spectrum, the intensity, and the shape of illumination light, the number of light sources 57, and the position of the illumination light source 57, by using information concerning the segmentation according to the surface attribute, the representing point the surface attribute of which needs to be estimated, the segmentation according to the complexity of the shape, and a material category prepared beforehand into which the surface attribute falls.

A surface attribute estimation process parameter setter 87 determines the relationship between pixels on the surface of the target object, the correspondence of pixels between multi-line-of-sight images, parameters relating to the light source, and constraints in the surface attribute value of each pixel in the surface attribute estimation process, by using user information concerning the segmentation according to the surface attribute, the representing point the surface attribute of which needs to be estimated, the corresponding points between the multi-line-of-sight images, the light source, and a material category prepared beforehand into which the surface attribute falls.

The observation environment determining unit 82 generates the observation environment data such as desired illumination conditions, and the position and alignment of the target object in response to a user input operation.

An illumination light source setter 81 sets the color, the luminance, the position, the shape (a point light source, a line light source, an area light source, or collimated light) of illumination light, and the number of illumination light sources that illuminate the target object when the image is reconstructed.

An object layout setter 83 moves the target object in three-dimensional translations up or down, to the right or to the left, and toward or away from the user, and sets an angle of rotation about any axis of rotation. Based on these set values, the observation environment data to be used during the reconstruction of the image is generated.

FIG. 18 illustrates the interaction of the user with the input environment determining unit 86 in the operation device 19. A series of multi-line-of-sight images 31 obtained from the pre-measurement is presented on the display screen provided by the input environment determining unit 86. The user interactively sets parameters relating to the three-dimensional image acquisition or the surface attribute acquisition of the target object in the following setters.

The user sets a segment having a uniform surface attribute on the surface of the target object in a surface attribute segmentation setter 33. When a segment is selected on any of the series of multi-line-of-sight images 31, a segment corresponding to the selected segment is also presented on another image. The user sets the segment having the uniform surface attribute while monitoring the segmentation on each of the series of multi-line-of-sight images 31.

The user performs segmentation using a shape segmentation setter 34 according to the complexity of the shape of the target object. When a segment is selected on any of the series of multi-line-of-sight images 31, a segment corresponding to the selected segment is also presented on another image. The user sets a segment having a complex geometry and a segment having a smooth shape while monitoring the segmentation on each of the series of multi-line-of-sight images 31.

The user sets a point representing the surface attribute using a representing point setter 35. When a representing point is selected on any of the series of multi-line-of-sight images 31, a representing point corresponding to the selected representing point is also presented on another image. The user sets a representing point for which the surface attribute is estimated, while monitoring the representing points in the series of multi-line-of-sight images 31.

The user sets corresponding points between the multi-line-of-sight images using a corresponding point setter 36. When a point of interest is selected on one of the series of multi-line-of-sight images 31, a point corresponding to the point of interest in another image is calculated based on current internal parameters and is displayed.

The user checks the corresponding points in the series of multi-line-of-sight images 31, and corrects the corresponding points in each of multi-line-of-sight images 31 as necessary. As the corresponding points are corrected, the internal parameters are modified, and the correspondence in the segmentation according to the surface attribute, the segmentation according to the complexity of the shape, and the correspondence of the representing points across the images are also corrected.

Using a material list 37, the user designates the category of the predetermined material list (metal, plastic, wood, and fabric) in which the surface attribute falls, for each segment set by the surface attribute segmentation setter 33 or for each representing point set by the representing point setter 35.

The information set in the course of user interaction is converted into the input environment data.

As described above, the sixth embodiment raises the accuracy level in the three-dimensional shape measurement and the surface attribute estimation by permitting the user interaction in the acquisition of the three-dimensional shape and the surface attribute. A three-dimensional image with more reality thus results.

Seventh Embodiment

A seventh embodiment relates to a method of reconstructing a three-dimensional image with more reality by allowing the user to intervene as in the sixth embodiment.

Figure 19:
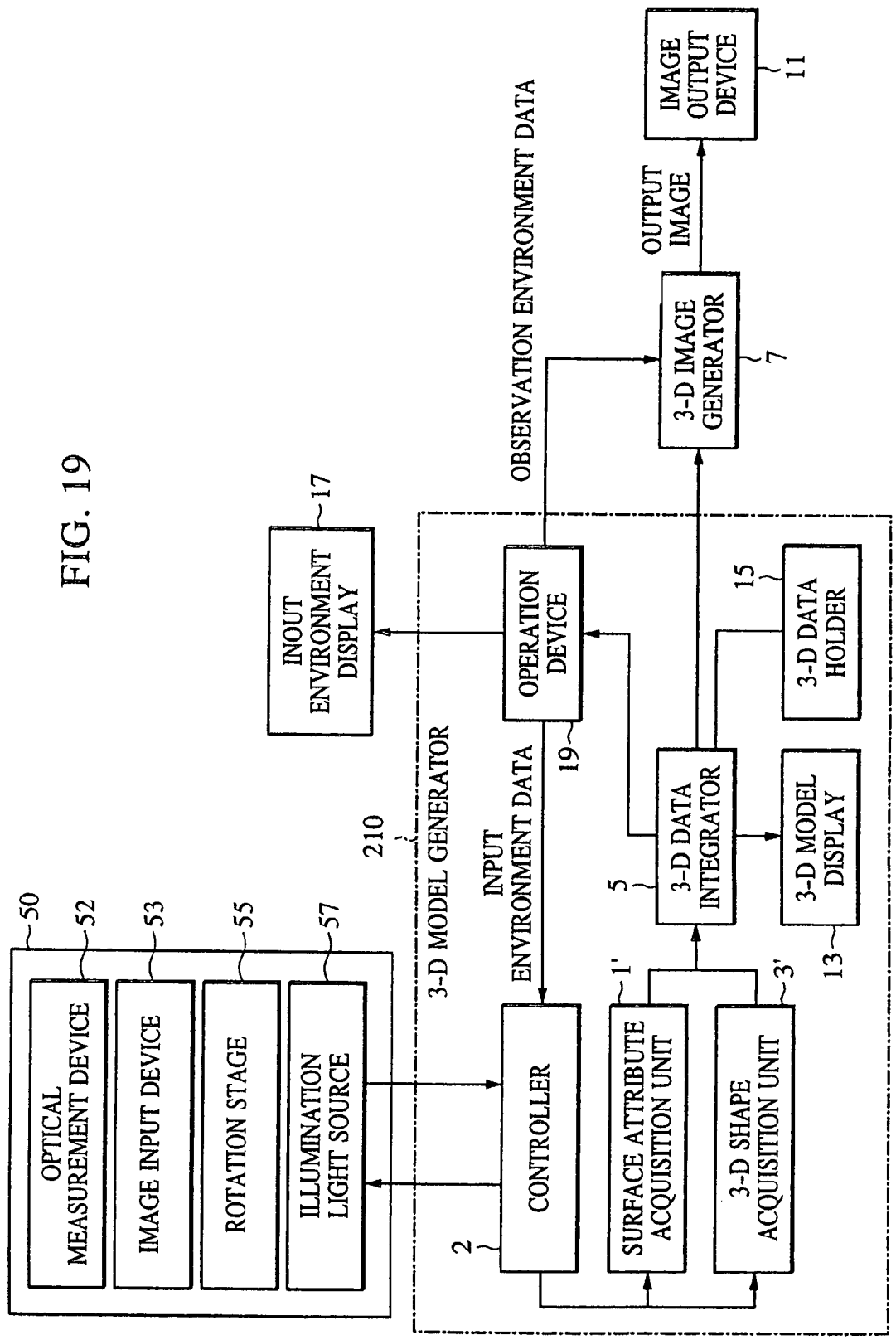
FIG. 19 is a block diagram illustrating the construction of the three-dimensional image processing apparatus in accordance with a seventh embodiment of the present invention.

FIG. 19 is a block diagram illustrating the three-dimensional image processing apparatus in accordance with the seventh embodiment of the present invention. The three-dimensional image processing apparatus of the seventh embodiment includes a three-dimensional model display 13 which displays three-dimensional intermediate data which is a tentative three-dimensional model produced to help the user to determine the necessity of a re-measurement, a three-dimensional intermediate data holder 15 which holds produced three-dimensional intermediate data, and an input environment display 17 which presents, to the user, values set in the input environment data in the form of a series of multi-line-of-sight images or a series of parameters.

Upon viewing the three-dimensional intermediate data displayed on the three-dimensional model display 13, the user determines the necessity of the re-measurement. If the data is reliable enough, requiring no re-measurement, the three-dimensional intermediate data is consolidated as a three-dimensional model. If the data is not reliable enough, thereby requiring a re-measurement, the user interacts with the operation device 19 repeatedly until reliable data is obtained.

The user does not need to re-measure the entire surface of the target object. The user examines the displayed three-dimensional intermediate data, and corrects part of the three-dimensional intermediate data as necessary. Information such as a measured position is described in the input environment data, and only a segment having a low reliability is re-measured. Each time, corresponding portion of the three-dimensional intermediate data is updated, and the measurement is efficiently carried out.

With the input environment display 17, the user determines whether the produced input environment data is appropriate. The user interacts again with the operation device 19 as necessary, and updates the input environment data.

Figure 20:
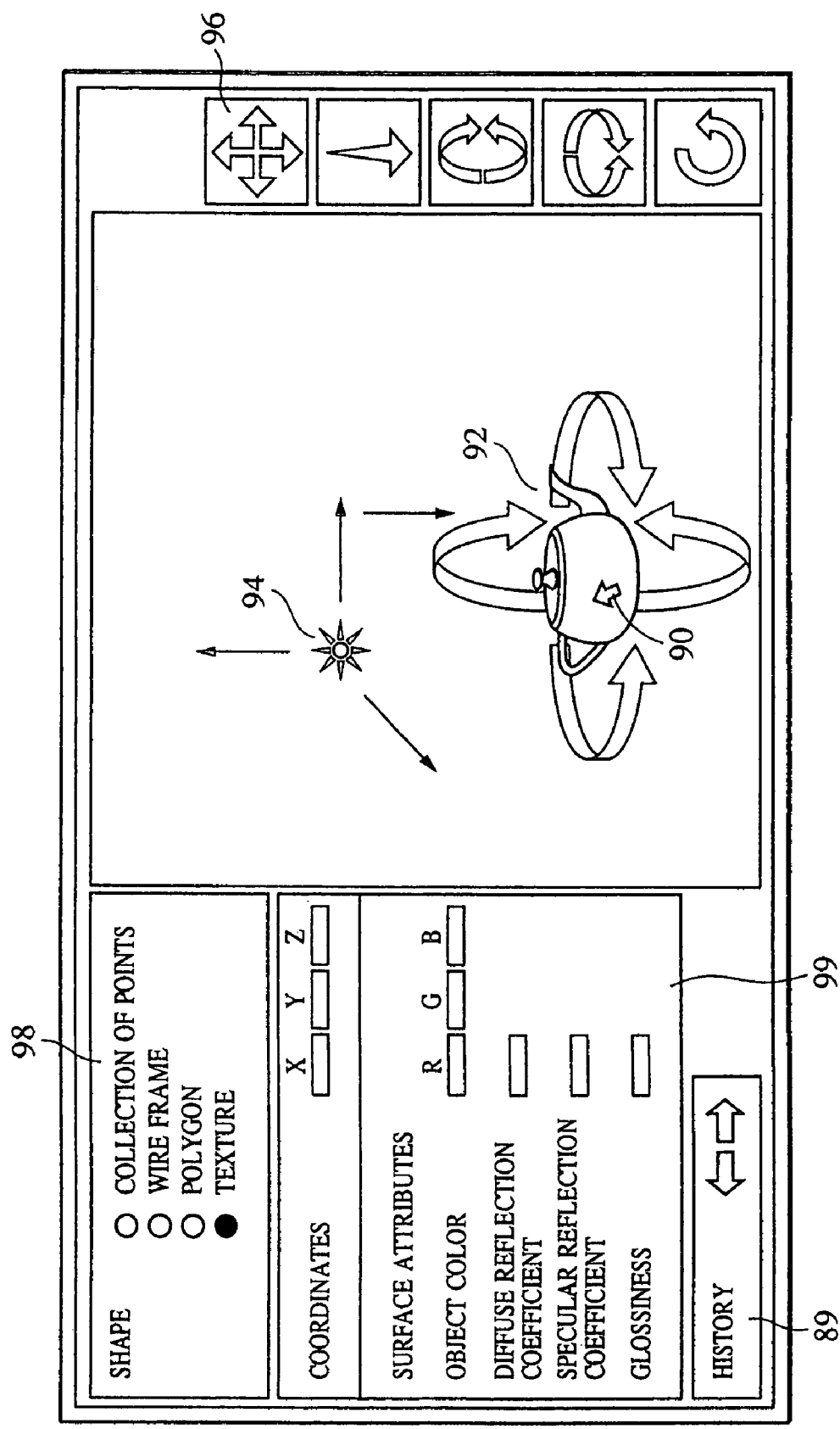
FIG. 20 illustrates three-dimensional data and a three-dimensional model displayed on the three-dimensional image processing apparatus in accordance with the seventh embodiment.

FIG. 20 illustrates one example of display on the three-dimensional model display 13. In the display screen of the three-dimensional model display 13, an illumination light source 94 illuminates the target object, and can be placed anywhere in the observation space. A target object layout setter 96 moves and rotates a tentative three-dimensional model in the observation space in any direction as shown by reference numeral 92. The user thus checks the reliability of the tentative three-dimensional model by monitoring the reconstructed three-dimensional image from a desired angle.

The user selects the method of displaying the three-dimensional image using a shape display method selector 98. For example, the user may select one from a point set display, a wire frame display, a polygon display, and a texture display. The user switches the display method as necessary, thereby easily verifying the reliability of the tentative three-dimensional model.

A attribute value display 99 displays attribute values such as three-dimensional coordinates, the object color, the diffuse reflection coefficient, the specular reflection coefficient, and the glossiness of the surface of the target object at one point thereof pointed by a pointer 90. In this way, the user verifies the reliability of the tentative three-dimensional model in more detail.

Figure 21:
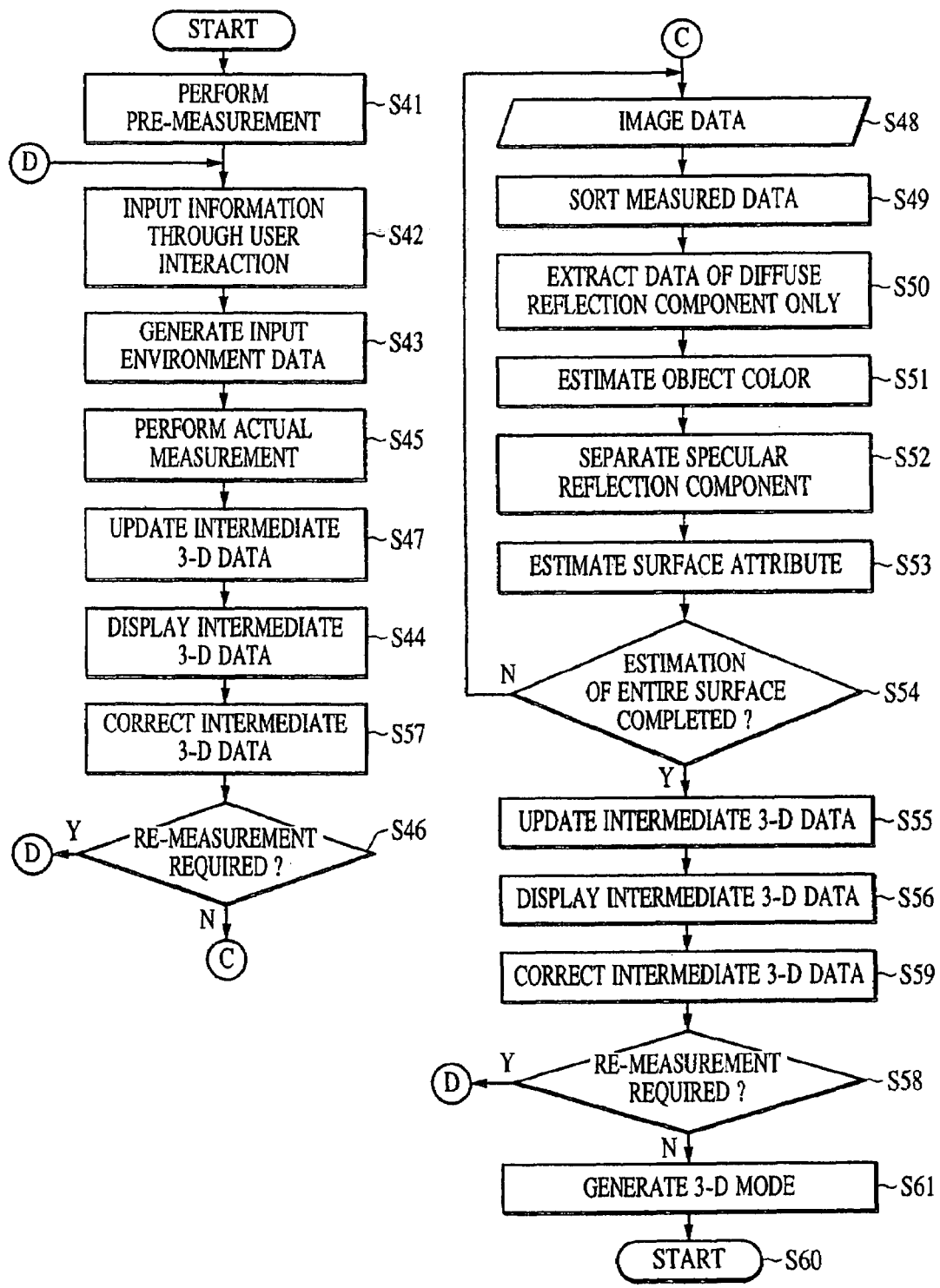
FIG. 21 is a flow diagram illustrating the process of the three-dimensional image processing apparatus of the seventh embodiment from a measurement to the production of a three-dimensional model.

FIG. 21 is a flow diagram of the three-dimensional image processing apparatus of the seventh embodiment from the measurement to the production of the three-dimensional model.

The pre-measurement is carried out to allow the user to interact with the operation device 19 (step S41). In succession, the user inputs information such as the segmentation according to the surface attribute, the representing point the surface attribute of which needs to be estimated, the segmentation according to the complexity of the shape, the corresponding points between the multi-line-of-sight images, the light source information, and a prepared beforehand into which the surface attribute falls (step S42). Based on these pieces of information, the input environment data is generated (step S43).

Based on the input environment data, the optical measurement device 52 and the image input device 53 input the measured data for each apex on the surface of the target object as in the sixth embodiment (step S45). The three-dimensional data relating to the three-dimensional shape is generated (step S47).

The produced three-dimensional data is displayed on the three-dimensional model display 13 (step S44). The user checks the displayed three-dimensional data monitoring the image, and partly corrects the three-dimensional data as necessary (step S57). The user assesses the reliability of the three-dimensional data, and determines the necessity for a re-measurement (step S46).

When the reliability of the data is not high enough, the user interacts with the apparatus for re-measurement. Based on the input environment data newly produced through the interaction, the process from the measurement is performed again. The process is repeated until the reliability of the data becomes sufficiently high.

The re-measurement is not necessarily performed on the entire surface of the target object. Only a segment having the data with a low reliability is measured, and each time corresponding portion of the three-dimensional intermediate data is updated, and corrected.

When the reliability of the shape data becomes sufficiently high, the surface attribute estimation process is performed on each apex using the image data selected from the two-reflection-component model as in the first embodiment.

If a segment having the uniform surface attribute is set up in the input environment data, the estimation process is carried out under the condition that the surface attribute is uniform in each segment. If a representing point of the surface attribute is set up, the representing point only is estimated. On other points, an interpolation process is performed based on the estimated value at the representing point.

If the category of a predetermined material list in which the surface attribute to be estimated falls is set, an estimation process appropriate for the material is carried out.

If the corresponding points between the multi-line-of-sight images and the light source information are set, an estimation process is carried out using these pieces of information.

When the estimation of the entire surface of the target object is completed (step S54), the held three-dimensional intermediate data is displayed on the three-dimensional model display 13 (step S56). The user checks the displayed three-dimensional intermediate data monitoring the image, and partly corrects the three-dimensional intermediate data as necessary (step S59). The user assesses the reliability of the three-dimensional intermediate data, and determines the necessity for re-measurement (step S58).

When the reliability of the estimated values at all apexes is sufficiently high, the three-dimensional model is generated from the three-dimensional intermediate data (step S61), and the process ends (step S60).

When there is an apex having an estimated value with a low reliability, new input environment data is produced for re-measurement, and the process from the measurement is performed again based on the input environment data. The process is repeated until the reliability of the data becomes sufficiently high.

The re-measurement is not necessarily performed on the entire surface of the target object. Only a segment having the data with a low reliability is measured, and each time, corresponding portion of the three-dimensional intermediate data is updated, and corrected. In the seventh embodiment, the unit of the surface of the target object is the apex. Instead of the apex, a infinitesimal area may be used.

In accordance with the seventh embodiment, the result of the three-dimensional data and the surface attribute data generated based on the acquired measured data are presented to the user, and the measured data is acquired repeatedly as necessary. The accuracy level in the acquisition of measured data is raised. Consequently, the reality of the resulting three-dimensional image is improved.

In accordance with the seventh embodiment, only a portion of the target object is measured using the input environment data, and only the corresponding portion of the three-dimensional intermediate data is updated as required. When the input environment data is varied, the three-dimensional data reflecting the variation is presented to the user. The input environment data is corrected as necessary. The measurement is thus efficiently performed. The accuracy level in the data acquisition is heightened.

Only the segment having a low data reliability is measured or corrected, thereby permitting a more detailed process. The accuracy level in the data acquisition is thus heightened.

Eighth Embodiment

An eighth embodiment relates to a method of reconstructing a three-dimensional image with more reality by allowing the user to intervene as in the sixth embodiment.

Figure 22:
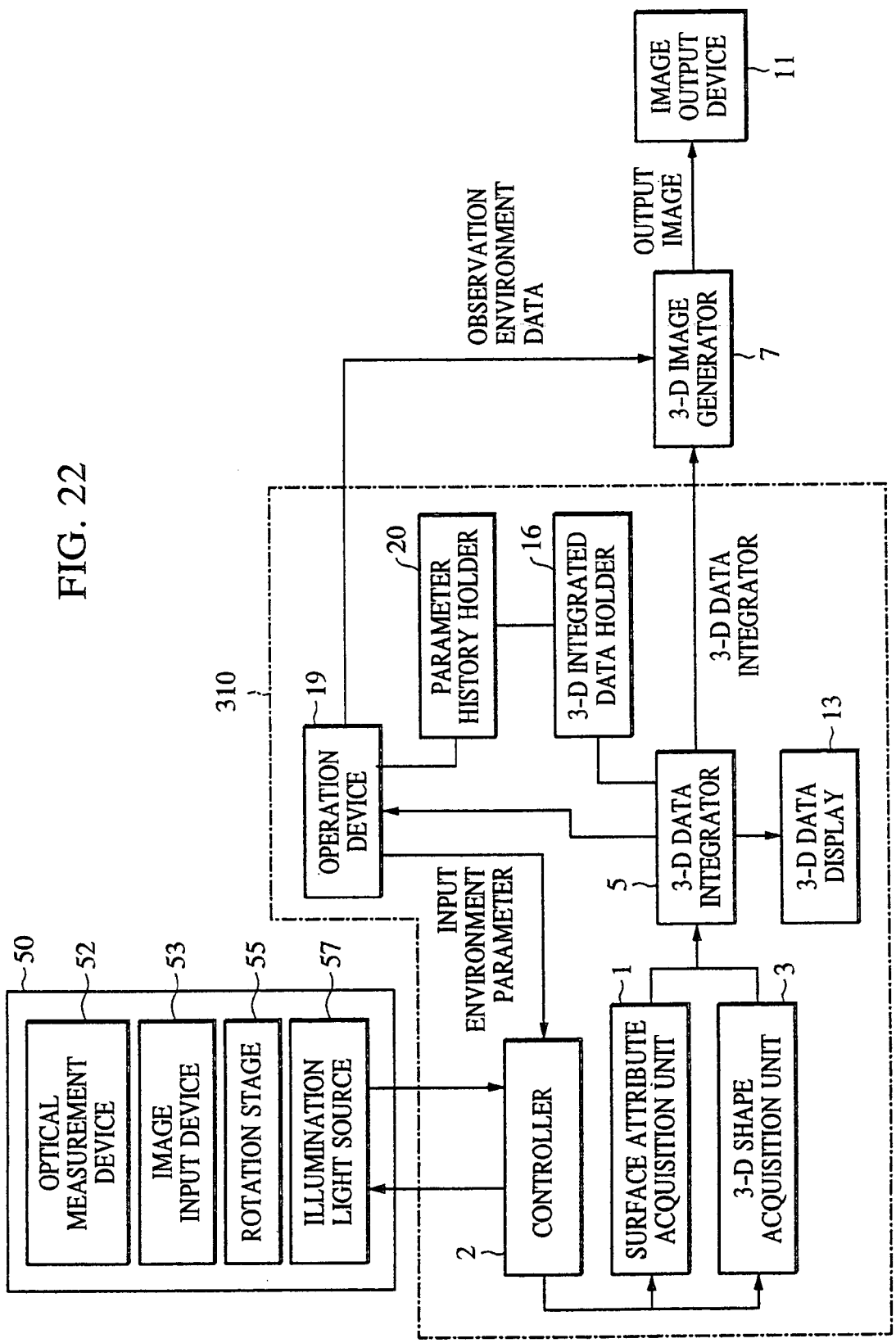
FIG. 22 is a block diagram illustrating the three-dimensional image processing apparatus of an eighth embodiment of the present invention.

FIG. 22 is a block diagram of the three-dimensional image processing apparatus in accordance with the eighth embodiment of the present invention. The three-dimensional image processing apparatus of the eighth embodiment includes a parameter history holder 20 and a three-dimensional integrated data holder 16 further to the three-dimensional model generator 110 in the sixth embodiment.

Using the operation device 19, the user inputs information such as the segmentation according to the surface attribute, the representing point the surface attribute of which needs to be estimated, the segmentation according to the complexity of the shape, the corresponding points between the multi-line-of-sight images, the light source, and a category prepared beforehand into which the surface attribute falls. The operation device 19 generates the input environment parameter based on the interaction with the user.

The three-dimensional integrated data holder 16 stores produced three-dimensional integrated data of the target object. The parameter history holder 20 stores parameters input in the past. The parameter history holder 20 and the three-dimensional integrated data holder 16 respectively store the input environment parameters when the measurement has been repeatedly performed, and the three-dimensional data corresponding to those parameters. Using a parameter history selector 89 shown in FIG. 20, the user checks the past input environment parameter and the history of three-dimensional integrated data.

When the re-measurement is required because of a low reliability of the measured data, the user may reference the past input environment parameter and the three-dimensional integrated data corresponding thereto. The user interaction is efficiently performed.

In accordance with the eighth embodiment, the history of the input environment parameter set when the data acquisition has been repeated, and the history of the acquired three-dimensional data are stored, and retrieved. The user interaction is thus efficiently performed. The accuracy level in the data acquisition is heightened.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A three-dimensional image processing apparatus for reconstructing a three-dimensional image of an object, comprising:

a three-dimensional model generator which generates, from the object, a three-dimensional model which is data for reconstructing the three-dimensional image of the object; and a three-dimensional image synthesizer which synthesizes the three-dimensional image from the three-dimensional model, and displays the three-dimensional image, wherein the three-dimensional model generator comprises:

a three-dimensional shape acquisition unit which acquires three-dimensional data relating to a shape of the object, a surface attribute acquisition unit which acquires surface attribute data relating to a surface attribute of the object, and a three-dimensional data integrator which generates the three-dimensional model by integrating the three-dimensional data acquired by the three-dimensional shape acquisition unit and the surface attribute data acquired by the surface attribute acquisition unit, wherein the three-dimensional image processing apparatus changes an image capturing environment to take an image data of an object according to an incoming signal.

2. A three-dimensional processing apparatus according to claim 1, wherein the surface attribute acquisition unit estimates the surface attribute of the object based on image data obtained from a captured image of the object.

3. A three-dimensional processing apparatus according to claim 2, wherein the surface attribute acquisition unit separates and extracts a diffuse reflection component and a specular reflection component from the image data to estimate the surface attribute.

4. A three-dimensional processing apparatus according to claim 2, wherein the surface attribute acquisition unit selects and uses data appropriate for estimating the surface attribute from the image data in the estimation of the surface attribute.

5. A three-dimensional processing apparatus according to claim 2, wherein the surface attribute acquisition unit comprises an image capturing environment controller which changes an image capturing environment to generate the image data in response to an operation by a user.

6. A three-dimensional processing apparatus according to claim 5, wherein the image capturing environment controller in the surface attribute acquisition unit controls at least one of a position, a color, and a shape of an illumination light source in the image capturing environment and a number of times of image capturing of the object.

7. A three-dimensional processing apparatus according to claim 1, wherein the three-dimensional data integrator generates the three-dimensional model by associating each point in a set of points forming the three-dimensional data with an independent piece of surface attribute data.

8. A three-dimensional processing apparatus according to claim 1, wherein the three-dimensional data integrator generates the three-dimensional model by associating a group of points belonging to a segment having a similar surface attribute, out of a set of points forming the three-dimensional data, with a common piece of surface attribute data.

9. A three-dimensional image processing apparatus for reconstructing a three-dimensional image of an object, comprising:
a three-dimensional model generator which generates, from the object, a three-dimensional model which is data for reconstructing the three-dimensional image of the object; and
a three-dimensional image synthesizer which synthesizes the three-dimensional image from the three-dimensional model, and displays the three-dimensional image,
wherein the three-dimensional image synthesizer comprises:
an operation device through which a user inputs an observation environment of the three-dimensional image, and
a three-dimensional image generator which generates the three-dimensional image of the object in the observation environment input through the operation device based on the three-dimensional model, wherein
the three-dimensional image processing apparatus changes an image capturing environment to take an image data of an object according to an incoming signal.

10. A three-dimensional image processing method for reconstructing a three-dimensional image of an object, comprising:
a three-dimensional model generating step, of generating, from the object, a three-dimensional model which is data for reconstructing the three-dimensional image of the object; and
a three-dimensional image synthesizing step, of synthesizing the three-dimensional image from the three-dimensional model, and displaying the three-dimensional image,
wherein the three-dimensional model generating step comprises:
a three-dimensional shape acquisition substep, acquiring three-dimensional data relating to a shape of the object,
a surface attribute acquisition substep, of acquiring surface attribute data relating to a surface attribute of the object, and
a three-dimensional data integrating substep, generating the three-dimensional model by integrating the three-dimensional data acquired in the three-dimensional shape acquisition substep and the surface attribute data acquired in the surface attribute acquisition substep, wherein
the three-dimensional image processing method changes an image capturing environment to take an image data of an object according to an incoming signal.

11. A three-dimensional processing method according to claim 10, wherein the surface attribute acquisition substep includes estimating the surface attribute of the object based on image data obtained from a captured image of the object.

12. A three-dimensional processing method according to claim 11, wherein the surface attribute acquisition substep includes separating and extracting a diffuse reflection component and a specular reflection component from the image data to estimate the surface attribute.

13. A three-dimensional processing method according to claim 11, wherein the surface attribute acquisition substep includes selecting and using data appropriate for estimating the surface attribute from the image data in the estimation of the surface attribute.

14. A three-dimensional processing method according to claim 11, wherein the surface attribute acquisition substep comprises an image capturing environment controlling process which changes an image capturing environment to generate the image data in response to an operation by a user.

15. A three-dimensional processing method according to claim 14, wherein the image capturing environment controlling process in the surface attribute acquisition substep controls at least one of a position, a color, and a shape of an illumination light source in the image capturing environment and a number of times of image capturing of the object.

16. A three-dimensional processing method according to claim 10, wherein the three-dimensional data integrating substep includes generating the three-dimensional model by associating each point in a set of points forming the three-dimensional data with an independent piece of surface attribute data.

17. A three-dimensional processing method according to claim 10, wherein the three-dimensional data integrating substep includes generating the three-dimensional model by associating a group of points belonging to a segment having a similar surface attribute, out of a set of points forming the three-dimensional data, with a common piece of surface attribute data.

18. A three-dimensional image processing method for reconstructing a three-dimensional image of an object, comprising:
a three-dimensional model generating step, of generating, from the object, a three-dimensional model which is data for reconstructing the three-dimensional image of the object; and
a three-dimensional image synthesizing step, of synthesizing the three-dimensional image from the three-dimensional model, and displaying the three-dimensional image,
wherein the three-dimensional image synthesizing step comprises:
an input substep, in which a user inputs an observation environment of the three-dimensional image, and
a three-dimensional image generating substep, of generating the three-dimensional image of the object in the observation environment input in the input substep based on the three-dimensional model, wherein
the three-dimensional image processing method changes an image capturing environment to take an image data of an object according to an incoming signal.

19. A computer-readable medium encoded with a computer program for reconstructing a three-dimensional image of an object, comprising:
a three-dimensional model generating step, of generating, from the object, a three-dimensional model which is data for reconstructing the three-dimensional image of the object; and
a three-dimensional image synthesizing step, of synthesizing the three-dimensional image from the three-dimensional model, and displays the three-dimensional image, wherein the three-dimensional model generating step comprises:
a three-dimensional shape acquisition substep, of acquiring three-dimensional data relating to a shape of the object,
a surface attribute acquisition substep, of acquiring surface attribute data relating to a surface attribute of the object, and
a three-dimensional data integrating substep, of generating the three-dimensional model by integrating the three-dimensional data acquired in the three-dimensional shape acquisition substep and the surface attribute data acquired in the surface attribute acquisition substep, wherein
the three-dimensional image processing computer program changes an image capturing environment to take an image data of an object according to an incoming signal.

20. A computer-readable medium encoded with a computer program according to claim 19, wherein the surface attribute acquisition substep includes estimating the surface attribute of the object based on image data obtained from a captured image of the object.

21. A computer-readable medium encoded with a computer program according to claim 20, wherein the surface attribute acquisition substep includes separating and extracting a diffuse reflection component and a specular reflection component from the image data to estimate the surface attribute.

22. A computer-readable medium encoded with a computer program according to claim 20, wherein the surface attribute acquisition substep includes selecting and using data appropriate for estimating the surface attribute from the image data in the estimation of the surface attribute.

23. A computer-readable medium encoded with a computer program according to claim 20, wherein the surface attribute acquisition substep comprises an image capturing environment controlling process which changes an image capturing environment to generate the image data in response to an operation by a user.

24. A computer-readable medium encoded with a computer program according to claim 23, wherein the image capturing environment controlling process in the surface attribute acquisition substep controls at least one of a position, a color, and a shape of an illumination light source in the image capturing environment and a number of times of image capturing of the object.

25. A computer-readable medium encoded with a computer program according to claim 19, wherein the three-dimensional data integrating substep includes generating the three-dimensional model by associating each point in a set of points forming the three-dimensional data with an independent piece of surface attribute data.

26. A computer-readable medium encoded with a computer program according to claim 19, wherein the three-dimensional data integrating substep includes generating the three-dimensional model by associating a group of points belonging to a segment having a similar surface attribute, out of a set of points forming the three-dimensional data, with a common piece of surface attribute data.

27. A computer-readable medium encoded with a computer program for reconstructing a three-dimensional image of an object, comprising:
a three-dimensional model generating step, of generating, from the object, a three-dimensional model which is data for reconstructing the three-dimensional image of the object; and
a three-dimensional image synthesizing step, of synthesizing the three-dimensional image from the three-dimensional model, and displaying the three-dimensional image,
wherein the three-dimensional image synthesizing step comprises:
an input substep, in which a user inputs an observation environment of the three-dimensional image, and
a three-dimensional image generating substep, of generating the three-dimensional image of the object in the observation environment input in the input substep based on the three-dimensional model, wherein
the three-dimensional image processing computer program changes an image capturing environment to take an image data of an object according to an incoming signal.

28. A method for generating a three-dimensional model for use in reconstructing a three-dimensional image, the method comprising:
a first step, of acquiring three-dimensional data relating to a shape of an object;
a second step, of determining surface attribute data from image data relating to an appearance of the object, and the three-dimensional data; and
a third step, of generating the three-dimensional model by integrating the three-dimensional data and the surface attribute data,
wherein the manner of determining the surface attribute data in the second step is modified for every segment which is differentiated based on the three-dimensional data acquired in the first step.

29. A method according to claim 28, wherein, based on the three-dimensional data acquired in the first step, a differentiation is made between a point having a complex change in the surrounding geometry thereof and a point having a monotonic change or no change in the surrounding geometry thereof in connection with each point in a set of points forming the three-dimensional data at each segment of the object, and the manner of determining the surface attribute data in the second step is modified for every segment.

30. A method according to claim 29, wherein, based on the image data and the three-dimensional data, the second step includes determining the surface attribute data of a point which is differentiated as being a point having a monotonic change in the surrounding geometry thereof, out of the set of points forming the three-dimensional data.

31. A method according to claim 29, wherein, in connection with a point which is differentiated as being a point having a complex change in the surrounding geometry thereof, out of the set of points forming the three-dimensional data, the second step includes regarding the surface attribute data of a point, which is adjacent to the point having the complex change and is differentiated as being a point having a monotonic change or no change in the surrounding geometry thereof, as surface attribute data of the point having the complex change.

32. A method for generating a three-dimensional model for use in reconstructing a three-dimensional image, the method comprising:
a first step, of acquiring three-dimensional data relating to a shape of an object;
a second step, of determining surface attribute data from image data relating to an appearance of the object, and the three-dimensional data; and a third step, of generating the three-dimensional model by integrating the three-dimensional data and the surface attribute data, wherein the manner of determining the surface attribute data in the second step is modified for every segment which is differentiated based on the image data.

33. A method according to claim 32, further comprising the steps of extracting a segment of the object on which the image data is substantially uniform, regarding the surface attribute data determined for at least one point in a set of points forming the three-dimensional data within the extracted segment as surface attribute data for all points in that segment, and determining surface attribute data for points in a non-extracted segment on a point-by-point basis.

34. A computer-readable medium encoded with a computer program for generating a three-dimensional model for use in reconstructing a three-dimensional image, the computer program comprising:
   a first step, of acquiring three-dimensional data relating to a shape of an object;
   a second step, of determining surface attribute data from image data relating to an appearance of the object, and the three-dimensional data; and
   a third step, of generating the three-dimensional model by integrating the three-dimensional data and the surface attribute data,
   wherein the manner of determining the surface attribute data in the second step is modified for every segment which is differentiated based on the three-dimensional data acquired in the first step.

35. A computer-readable medium encoded with a computer program according to claim 34, wherein, based on the three-dimensional data acquired in the first step, a differentiation is made between a point having a complex change in the surrounding geometry thereof and a point having a monotonic change or no change in the surrounding geometry thereof in connection with each point in a set of points forming the three-dimensional data at each segment of the object, and the manner of determining the surface attribute data in the second step is modified for every segment.

36. A computer-readable medium encoded with a computer program according to claim 35, wherein, based on the image data and the three-dimensional data, the second step includes determining the surface attribute data of a point which is differentiated as being a point having a monotonic change or no change in the surrounding geometry thereof, out of the set of points forming the three-dimensional data.

37. A computer-readable medium encoded with a computer program according to claim 35, wherein in connection with a point which is differentiated as being a point having a complex change in the surrounding geometry thereof, out of the set of points forming the three-dimensional data, the second step includes regarding the surface attribute data of a point, which is adjacent to the point having the complex change and is differentiated as being a point having a monotonic change or no change in the surrounding geometry thereof, as surface attribute data of the point having the complex change.

38. A computer-readable medium encoded with a computer program for generating a three-dimensional model for use in reconstructing a three-dimensional image, the computer program comprising:
   a first step, of acquiring three-dimensional data relating to a shape of an object;
   a second step, of determining surface attribute data from image data relating to an appearance of the object, and the three-dimensional data; and
   a third step, of generating the three-dimensional model by integrating the three-dimensional data and the surface attribute data,
   wherein the manner of determining the surface attribute data in the second step is modified for every segment which is differentiated based on the image data.

39. A computer-readable medium encoded with a computer program according to claim 38, further comprising the steps of extracting a segment of the object on which the image data is substantially uniform, regarding the surface attribute data determined for at least one point in a set of points forming the three-dimensional data within the extracted segment as surface attribute data for all points in that segment, and determining surface attribute data for points in a non-extracted segment on a point-by-point basis.

40. A generator for generating a three-dimensional model for use in reconstructing a three-dimensional image, the generator comprising:
   a three-dimensional shape acquisition unit for acquiring three-dimensional data relating to a shape of an object;
   a surface attribute acquisition unit for acquiring surface attribute data from image data relating to an appearance of the object, and the three-dimensional data; and
   a three-dimensional data integrator for generating the three-dimensional model by integrating the three-dimensional data and the surface attribute data,
   wherein the manner of determining the surface attributed data by the surface attribute acquisition unit is modified for every segment which is differentiated based on the three-dimensional data acquired by said three-dimensional shape acquisition unit.

41. A generator according to claim 40, wherein based on the three-dimensional data acquired by the three-dimensional shape acquisition unit, a differentiation is made between a point having a complex change in the surrounding geometry thereof and a point having a monotonic change or no change in the surrounding geometry thereof in connection with each point in a set of points forming the three-dimensional data at each segment of the object, and the manner of determining the surface attribute data by the surface attribute acquisition unit is modified for every segment.

42. A generator according to claim 41, wherein the surface attribute acquisition unit determines, based on the image data and the three-dimensional data, the surface attribute data of a point which is differentiated as being a point having a monotonic change or no change in the surrounding geometry thereof, out of the set of points forming the three-dimensional data.

43. A generator according to claim 41, wherein in connection with a point which is differentiated as being a point having a complex change in the surrounding geometry thereof, out of the set of points forming the three-dimensional data, the surface attribute acquisition unit regards the surface attribute data of a point, which is adjacent to the point having the complex change and is differentiated as being a point having a monotonic change or no change in the surrounding geometry thereof, as surface attribute data of the point having the complex change.

44. A generator for generating a three-dimensional model for use in reconstructing a three-dimensional image, the generator comprising:
   a three-dimensional shape acquisition unit for acquiring three-dimensional data relating to a shape of an object;

a surface attribute acquisition unit for acquiring surface attribute data from image data relating to an appearance of the object, and the three-dimensional data; and a three-dimensional data integrator for generating the three-dimensional model by integrating the three-dimensional data and the surface attribute data, wherein the manner of determining the surface attribute data by the surface attribute acquisition unit is modified for every segment which is differentiated based on the image data.

45. A generator according to claim 44, wherein a segment of the object on which the image data is substantially uniform is extracted, the surface attribute data determined for at least one point in a set of points forming the three-dimensional data within the extracted segment is regarded as surface attribute data for all points in that segment, and surface attribute data for points in a non-extracted segment is determined point by point.

46. A three-dimensional image processing system comprising a generator for generating a three-dimensional model according to claim 40, a shape measurement device for measuring a shape of an object, and an image capturing device for capturing an image of the object.

47. A three-dimensional image processing system comprising a generator for generating a three-dimensional model according to claim 44, a shape measurement device for measuring a shape of an object, and an image capturing device for capturing an image of the object.

* * * * *